(12) United States Patent
Denoual et al.

(10) Patent No.: US 12,375,704 B2
(45) Date of Patent: Jul. 29, 2025

(54) METHOD AND APPARATUS FOR ENCAPSULATING VIDEO DATA INTO A FILE

(71) Applicant: CANON KABUSHIKI KAISHA, Tokyo (JP)

(72) Inventors: Franck Denoual, Saint Domineuc (FR); Naël Ouedraogo, Val d'Anast (FR); Frédéric Maze, Langan (FR); Hervé Ruellan, Rennes (FR); Jean Le Feuvre, Gometz-le-Chatel (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/488,153

(22) Filed: Sep. 28, 2021

(65) Prior Publication Data

US 2022/0166997 A1    May 26, 2022

(30) Foreign Application Priority Data

Sep. 29, 2020 (GB) ..................................... 2015415

(51) Int. Cl.
*H04N 19/46* (2014.01)
*H04N 19/169* (2014.01)
*H04N 19/44* (2014.01)

(52) U.S. Cl.
CPC ........... *H04N 19/46* (2014.11); *H04N 19/188* (2014.11); *H04N 19/44* (2014.11)

(58) Field of Classification Search
CPC .. G01N 33/5079; H04N 19/188; H04N 19/44; H04N 19/46; H04N 21/234327;
(Continued)

(56) References Cited

U.S. PATENT DOCUMENTS 12,108,081 B2* 10/2024 Newman ............... H04N 19/597
12,244,805 B2*  3/2025 Ramasubramonian ......................
                                                H04N 19/44
(Continued)

FOREIGN PATENT DOCUMENTS

CN    101924944 A    12/2010
CN    104054345 A     9/2014
(Continued)

OTHER PUBLICATIONS

ITU-T Telecommunication Standardization Sector Series H: Audiovisual and Multimedia Systems Infrastructure of audiovisual services—Coding of moving video, Versatile Video Coding H.266, Aug. 2020 (Year: 2020).*

(Continued)

*Primary Examiner* — William C Vaughn, Jr.
*Assistant Examiner* — Astewaye Gettu Zewede
(74) *Attorney, Agent, or Firm* — Canon U.S.A., Inc. IP Division

(57) ABSTRACT

A method of encapsulating a bitstream of encoded video data in a media file, the method comprising: obtaining the bitstream comprising a second plurality of operating points, video data in the bitstream being organized into NAL units; the bitstream being filtered from an original bitstream, the original bitstream comprising a first plurality of operating points, the first plurality of operating points comprising at least the second plurality of operating points; obtaining from the bitstream a first NAL unit describing the first plurality of operating points; obtaining form the bitstream a second NAL unit describing the second plurality of operating points; generating the media file comprising the bitstream and comprising at least one metadata structure describing the second plurality of operating points; wherein the at least
(Continued)

one metadata structure is generated based on both the first and second NAL units.

15 Claims, 8 Drawing Sheets

(58) Field of Classification Search
CPC ........... H04N 21/2353; H04N 21/2389; H04N 21/84; H04N 21/845; H04N 21/85406; H04N 21/2343; H04N 21/236; H04N 21/854
USPC .......................................................... 375/240
See application file for complete search history.

(56) References Cited

U.S. PATENT DOCUMENTS

| | | | |
|---|---|---|---|
| 2016/0112724 | A1 | 4/2016 | Hendry |
| 2016/0373771 | A1* | 12/2016 | Hendry ................. H04N 19/30 |
| 2020/0245041 | A1 | 7/2020 | Maze et al. |
| 2022/0086496 | A1* | 3/2022 | Wang ................... H04N 19/188 |
| 2022/0094909 | A1* | 3/2022 | Hannuksela ......... H04N 19/167 |

FOREIGN PATENT DOCUMENTS

| | | | |
|---|---|---|---|
| CN | 104620587 A | 5/2015 | |
| CN | 104662914 A | 5/2015 | |
| CN | 104662916 A | 5/2015 | |
| CN | 106170982 A | 11/2016 | |
| CN | 106464922 A | 2/2017 | |
| CN | 107750461 A | 3/2018 | |
| EP | 3972266 A1 | 3/2022 | |
| GB | 2535453 A | 8/2016 | |
| WO | WO-2015187978 A1 * | 12/2015 | ............. H04N 19/00 |

OTHER PUBLICATIONS

Technologies under Consideration for NAL File Format, ISO/IEC JTC 1/SC 29/WG 11 Coding of moving pictures and audio, Jul. 12, 2020, 35 pages.

Kashyap Kammachi-Sreedhar, et al., (5.2) [4496-15] Carriage of VVC bitstream(s) with multiple layers, International Organisation for Standardisation, Coding of Moving Pictures and Audio, ISO/IEC JTC1/SC29/WG11 MPEG2020/ m53483, Apr. 2020, 3 pages.

Hendry, et al., Comments on Storage of tiled Video in ISO/IEC 14496-15, International Organisation for Standardisation, Coding of Moving Pictures and Audio, ISO/IEC JTC1/SC29/WG11 MPEG2016/M38225r3, May-Jun. 2016, 7 pages.

Information Technology—Coding of Audio-Visual Objects—Part 15: Carriage of Network Abstraction Layer (NAL) Unit Structured Video in the ISO Base Media File Format; MPEG Meeting, ISO/IEC/JTC1/SC29/WG11, Jan. 13, 2014, 196 pages.

Zhu et al. "Multi layer video coding extensions of HEVC standard" Journal of Nanjing University of Posts and Telecommunications ( Natural Science Edition) vol. 35, No. 3, Jun. 2015.

* cited by examiner

METHOD AND APPARATUS FOR ENCAPSULATING VIDEO DATA INTO A FILE

CROSS REFERENCE TO RELATED APPLICATION

This application claims the benefit under 35 U.S.C. § 119(a)-(d) of United Kingdom Patent Application No. 2015415.9, filed on Sep. 29, 2020 and entitled "METHOD AND APPARATUS FOR ENCAPSULATING VIDEO DATA INTO A FILE". The above cited patent application is incorporated herein by reference in its entirety.

FIELD OF THE DISCLOSURE

The present disclosure concerns a method and a device for encapsulating video data into a file. It concerns more particularly the encapsulation of VVC bitstream into an ISOBMFF data file.

BACKGROUND

The International Standard Organization Base Media File Format (ISO BMFF, ISO/IEC 14496-12) is a well-known flexible and extensible file format that encapsulates and describes encoded timed or non-timed media data either for local storage or for transmission via a network or via another bitstream delivery mechanism. An example of extensions is ISO/IEC 14496-15 that describes encapsulation tools for various NAL (Network Abstraction Layer) unit-based video encoding formats. Examples of such encoding formats are AVC (Advanced Video Coding), SVC (Scalable Video Coding), HEVC (High Efficiency Video Coding), L-HEVC (Layered HEVC) and VVC (Versatile Video Coding). Another example of file format extension is ISO/IEC 23008-12 that describes encapsulation tools for still images or sequence of still images such as HEVC Still Image. Another example of file format extension is ISO/IEC 23090-2 that defines the omnidirectional media application format (OMAF). The ISO Base Media file format is object-oriented. It is composed of building blocks called boxes corresponding to data structures characterized by a unique type identifier, typically a four-characters code, also noted FourCC or 4CC. Full boxes are data structures similar to boxes comprising in addition a version and flags value attributes. In the following, the term box may designate both full boxes or boxes. Those boxes or full boxes are hierarchically or sequentially organized in the ISOBMFF file and define parameters describing the encoded timed or non-timed media data, its structure and timing, if any. All data in an encapsulated media file (media data and metadata describing the media data) is contained in boxes. There is no other data within the file. File-level boxes are boxes that are not contained in other boxes.

In the file format, the overall media presentation is called a movie. The movie is described by a movie box (with the four-character code 'moov') at the top level of the file. This movie box represents an initialization information container containing a set of various boxes describing the media presentation. It is logically divided into tracks represented by track boxes (with the four-character code 'trak'). Each track (uniquely identified by a track identifier (track_ID)) represents a timed sequence of media data belonging to the presentation (frames of video or audio samples, for example). Within each track, each timed unit of data is called a sample; this might be a frame of video, audio or timed metadata. Samples are implicitly numbered in decoding order sequence. Each track box contains a hierarchy of boxes describing the samples of a track, e.g. a sample table box ('stbl') contains all the time and data indexing of the media samples in a track. The actual sample data are stored in boxes called Media Data Boxes (with the four-character code 'mdat') or Identified Media Data Boxes (with the four-character code 'imda', similar to the Media Data Box but containing an additional identifier) at the same level as the movie box. The movie may also be fragmented and organized temporally as a movie box containing information for the whole presentation followed by a list of media fragments, i.e., a list of couple movie fragment and Media Data boxes ('mdat' or 'imda'). Within a movie fragment (box with the four-character code 'moof') there is a set of track fragments (box with the four-character code 'traf') describing the tracks within the media fragment, zero or more per movie fragment. The track fragments in turn contain zero or more track run boxes ('trun'), each of which document a contiguous run of samples for that track fragment.

An ISOBMFF file may contain multiple encoded timed media data or sub-parts of encoded timed media data forming multiple tracks. When sub-parts correspond to one or successive spatial parts of a video source, taken over the time (e.g. at least one rectangular region, sometimes called 'tile' or 'sub-picture', taken over the time), the corresponding multiple tracks may be called tile tracks or sub-picture tracks. When the bitstream is a layered bitstream (e.g. scalability layers in SVC, HEVC or VVC or layers for Multiview in MVC, HEVC or VVC or independent layers like in VVC), one or more layers may be encapsulated into one track. These tracks may correspond to spatial parts of a video source.

The compression of video relies on block-based video coding in most coding systems like HEVC, standing for High Efficiency Video Coding, or the emerging VVC, standing for Versatile Video Coding, standard. This document focus, while not limited to, on VVC encoded bitstreams. In these encoding systems, a video is composed of a sequence of frames or pictures or images or samples which may be displayed at several different times. In the case of multi layered video (for example scalable, stereo, 3D videos), several frames may be decoded to compose the resulting image to display at one instant.

According to VVC standard, video data are organized into Network Abstraction Layer Units, or NAL Units, or NALU. A NAL unit is a logical unit of data for the encapsulation of data in the encoded bitstream. NAL units are classified into VCL and non-VCL NAL units. The VCL NAL units contain the data that represents the values of the samples in the video pictures, and the non-VCL NAL units contain any associated additional information such as parameter sets (important header data that can apply to a large number of VCL NAL units) and supplemental enhancement information (timing information and other supplemental data that may enhance usability of the decoded video signal but are not necessary for decoding the values of the samples in the video pictures).

A layer corresponds to a set of VCL NAL units that all have a particular value of nuh_layer_id and the associated non-VCL NAL units. In VVC layers may be independent and then correspond to all the necessary data for decoding a video, or the decoding of a given layer may need some data form another layer, meaning that the decoding the video corresponding to a layer may require the decoding of several related layers. In this latter case, the layers are said to be dependent.

In a VVC bitstream, layers are organized into Output Layer Sets (OLS) corresponding to a set of related layers. In an OLS, at least one layer must be marked as an output layer. An output layer being a layer meant to be output by the decoder. At decoding, a decoder selects an OLS and must decode all the output layers in the OLS to produce the output images of the output video sequence. Several output layers may be present in the OLS. This is the case, for example, when the output correspond to a stereoscopic video sequence composed of two different video sequences, the right and the left video sequences. When an OLS comprises several independent layers, they may be all marked as output layers.

A layer may be organized into sub layers corresponding to a temporal scalability encoding of the corresponding video data. In this case, a base sub layer corresponds to the lowest temporal video data, for example a 30 Hz video sequence, while successive sub layers allows decoding higher temporal version of the video, for example 60 Hz or 120 Hz. Each sub layer is identified by a TemporalId (in the NAL unit header) indicative of the hierarchy of the sub layer in the temporal scalability encoding scheme.

An operation point (OP), also called operating point, both wording being equivalent, corresponds to a temporal subset of an OLS, it is identified by an OLS index identifying the associated OLS. Each operating point is related to an output layer set, a max TemporalId value, and a profile, level and tier signalling. An operating point may be identified and a highest value of TemporalId. An operation point may thus be seen as an OLS possibly limited in temporal resolution.

In VVC bitstream a particular non-VCL NAL unit, called the Video Parameter Set (VPS) provides information on the organization of the bitstream. In particular, it describes the different layers, sub layers, their dependencies, their organization in OLS and the list of operation points present in the bitstream. Some SEI messages may also provide further information on specific OLSs, specific layers, or specific sets of subpictures, like for example on scalable nesting SEI message.

When encapsulating a VVC bitstream into an ISOBMFF file the different layers are encapsulated into one or several tracks reflecting the organization of the bitstream. Some of the structures present in the metadata part of the ISOBMFF file are used to describe the organization of the bitstream encapsulated into the file. In particular, a box called 'vopi' is used to describe the different operation points in the bitstream, a box called 'linf' is used to describe the layers and sub layers present in a given track, and a box called 'opeg' describes the mapping of tracks to operation points and profile level information. The content of these boxes is derived from the VPS NAL units in the VVC bitstream. While 'vopi' and 'linf' apply to groups of samples, i.e. they can change along the bitstream, the 'opeg' structure is static, i.e. a single instance for the whole bitstream. For a given bitstream, there is at most one track carrying the 'vopi' sample group. The 'vopi' information applies to group of samples from all tracks referencing this at most one track using the 'oref' track reference type. The 'linf' structure describes, for a given track, the list of layers and sub layers this track carries.

A VVC bitstream might be filtered. This means that an original VVC bitstream, subject to a filtering process, results in a filtered (or restricted) VVC bitstream where some of the original layers and operation points or some sub-layers have been suppressed. A filtered VVC bitstream will be provided with optional non-VCL NAL units named OPI (standing for operating point information) describing the operation points that are actually present in the filtered VVC bitstream. Therefore, the presence of an OPI NAL unit in a VVC bitstreams first indicates that the VVC bitstream is a filtered (or restricted) bitstream, and second provides information on the operation points actually present in the filtered VVC bitstream. It is to be noted that the VPS NAL unit of a filtered VVC bitstream still provides information on the organization of the original VVC bitstream describing all the operation points, even those that have been filtered (or restricted) out in the VVC filtered bitstream. Some particular restriction or filtering may result in a set of filtered or restricted operating points actually matching the initial set of operating points. In a first example, this may be the case when the OPI NAL unit indicates an ols_idx that contains the layer with the highest layer ID in the bitstream, this layer having dependencies to other layers, and when it indicates as highest temporal ID the maximum temporal ID present in the bitstream. In a second example, this may be the case when the OPI NAL unit indicates an ols_idx that contains all the layers of the bitstream and when it indicates as highest temporal ID the maximum temporal ID present in the bitstream.

As a consequence, the encapsulation of a VVC filtered bitstream in an ISOBMFF file results in a metadata part providing the description of the original VVC bitstream describing some operation points and associated layers that may no longer be present in the file. As well, the metadata part providing the description of the original VVC bitstream may describe sub-layers that may no longer be present in the file. This may cause problems to an ISOBMFF parser that is not supposed to decode the NAL units and manipulate the file based on these metadata.

A VVC bitstream might correspond to a composition. A composition bitstream may comprise at least two independent layers marked as output layers. At decoding the at least two independent layers are to be decoded and may be composed to generate the output images of the output image video sequence. In order to be able to compose the output images, the decoder needs information describing the composition. In particular, information like the size of the composition and for each independent layer the position of this layer in the composition are required. According to VVC, composition information of independent layers of VVC bitstream may be provided in the bitstream as SEI messages. SEI messages are optional non-VCL NAL units and decoders may ignore these SEI NAL units at decoding. A decoder that ignores these SEI NAL units may not be able to render the composition.

SUMMARY

When encapsulating a VVC bitstream corresponding to a composition into an ISOBMFF data file, no meta data structure allows the description of the composition. A parser has to decode the SEI NAL units to be aware of the composition and the related parameters. It would be advantageous to provide a description of the composition that is independent of the encoding format. Such description may be placed in the metadata part of the media file in order to allow parsers or readers to be aware of the composition without having to decode encoding format-specific SEI NAL units of the encapsulated bitstream.

The present disclosure has been devised to address one or more of the foregoing concerns.

According to a first aspect of the present disclosure there is provided a method of encapsulating a bitstream of encoded video data in a media file, the method comprising:

obtaining the bitstream comprising a second plurality of operating points, video data in the bitstream being organized into NAL units; the bitstream being filtered from an original bitstream, the original bitstream comprising a first plurality of operating points, the first plurality of operating points comprising at least the second plurality of operating points;

obtaining from the bitstream a first NAL unit describing the first plurality of operating points;

obtaining from the bitstream a second NAL unit describing the second plurality of operating points;

generating the media file comprising the bitstream and comprising at least one metadata structure describing the second plurality of operating points;

wherein:

the at least one metadata structure is generated based on both the first and second NAL units.

According to another aspect of the present disclosure there is provided a method of encapsulating a bitstream of encoded video data in a media file, the method comprising:

obtaining the bitstream comprising a plurality of operating points, the plurality of operating points being associated with at least two independent layers of video data related to a composition, video data in the bitstream being organized into NAL units;

obtaining from the bitstream a NAL unit describing composition information applying to the at least two independent layers of video data;

generating the media file comprising the bitstream and at least one metadata structure describing the composition.

The methods according to the present disclosure may be computer implemented. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present disclosure may take the form of a computer program product embodied in any tangible medium of expression having computer usable program code embodied in the medium.

Since the present disclosure can be implemented in software, the present disclosure can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the present disclosure will now be described, by way of example only, and with reference to the following drawings in which.

DETAILED DESCRIPTION

In a first aspect of the present disclosure, a method of encapsulation a VVC filtered bitstream is provided that produces an ISOBMFF file where the metadata description of the bitstream is brought in conformance to the actual organization of the bitstream.

Figure 1A:
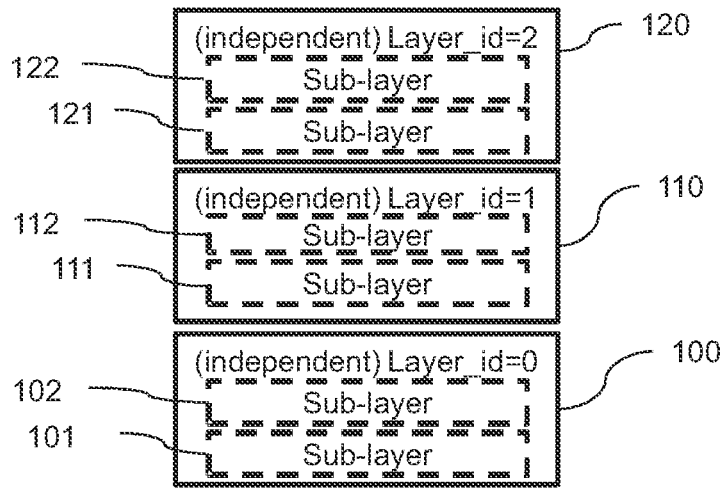
FIGS. 1a and 1b illustrate examples of bitstream with multiple layers.
Figure 1B:
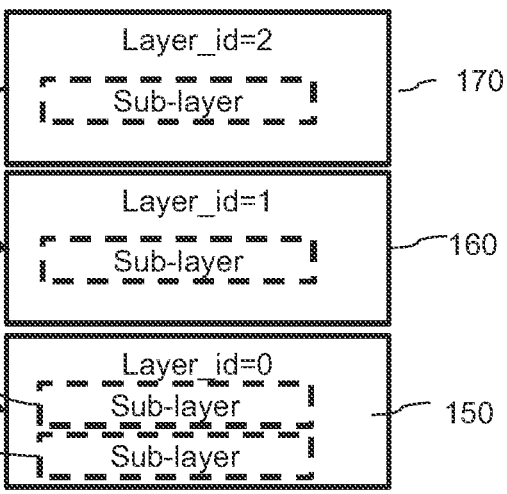

FIGS. 1a and 1b illustrate examples of bitstream with multiple layers.

FIG. 1a illustrates an example of a video bitstream where video frames may be encoded into one or more independent layers (100, 110 and 120). Each layer may correspond, for example, to an alternative quality of a same video, or to a different area (e.g. spatial part) of a same video. Each layer may contain one or more temporal sublayers (101, 102 or 111, 112 or 121, 122), for example one temporal sublayer containing 30 frames per second and a second one allowing 60 frames per second. On the example of FIG. 1a, the bitstream may be encoded with an indication, for example in the Video Parameter Set NAL unit, that 3 output layer sets (OLS) are available, one per layer, for example. The VPS allows implicit indexing of OLSs, as shown in 105, with the list of layers contained in each OLS. A decoder receiving such bitstream with multiple OLS has to perform an OLS selection to start the decoding process. When VVC is used as encoding format, the VVC specification defines rules for decoders to select such OLS (as a pair of target output layer set and highest temporal Id to decode). The first rule relies on external means. For example, an application controlling the decoder or a user interface or configuration file controlling the decoder provides these two parameters. The second rule relies on indication in the VVC bitstream, provided by the Operating Point Information NAL unit (OPI NALU) that may indicate for a coded video sequence an index of an output layer set and/or a value for the highest temporal ID. The last rule is a default one, standardized by VVC to select one OLS in the list of OLSs declared in the VPS NAL unit, based on their number of layers and output layers. This latter rule applies only on the first access unit in the bitstream while the two first apply on the first access unit of a coded video sequence. An access unit (AU) is defined as a set of Picture Units that belong to different layers and contain coded pictures associated with the same time for output from the Decoded Picture Buffer.

FIG. 1b illustrates another example of a video bitstream where video frames may be encoded into one or more layers (150, 160, 170). There may be dependencies between layers as shown by the arrows on the left (171, 172). In VVC (also for HEVC), the layer-dependencies are indicated in the VPS NAL unit(s). From the declaration in the VPS, three output layer sets (155) may be deduced from the configuration on FIG. 1b. In VVC, the selection of an OLS to decode follows the same three rules as explained according to FIG. 1a. Each output layer set in this example will contain (or reference) other layer(s). For example, the OLS with index 3 contains the layer 2, but also layers 1 and 0 due to dependencies. The dependencies come from the encoding scheme that may, for example, use reference frames from lower layers. On FIG. 1b, we can see that there is a different number of sublayers per layer. As an example, the lowest sublayer 151 contains NAL units with a temporal ID value equal to 0, while the sublayer 152 contains NAL units with temporal ID equal to 1. Of course, layers as in FIG. 1b could have a same number of sublayers. As well, there may be different layer reference than the one illustrated by 171 and 172. For example, both Layer 2 and Layer 1 could depend only on layer 0, or only one of layer 1 or 2 could have a dependency to another layer, the other one being independent.

Independently from FIG. 1a or FIG. 1b, a video bitstream may have layer or sublayer configuration changing along time. This may be indicated by a new VPS NAL unit. As well, the bitstream may contain several OPI NAL units along time. A new OPI NAL unit may occur when a new VPS happens, but may also happen without indication of a new VPS, for example to indicate that on some time interval, a given OLS is more relevant or recommended compared to others or a new filtering or restriction applies to the bitstream.

It is to be noted that the HEVC coding specification does not contain a NAL unit corresponding to the VVC OPI even if it allows description of bitstreams with multiple output layer sets. In HEVC, a filtered bitstream would be signalled using SEI non-VCL NAL units as no OPI non-VCL NAL unit is defined for HEVC. Beside this difference, the proposed method may be used in the context of HEVC by replacing the OPI NAL units by SEI NAL units, that may comprise equivalent filtering information on the OPI actually present in the filtered bitstream. With such mechanism in HEVC, the encapsulation of a filtered or restricted list of operating points in an HEVC bitstream may be done according to embodiments described hereafter.

Figure 2:
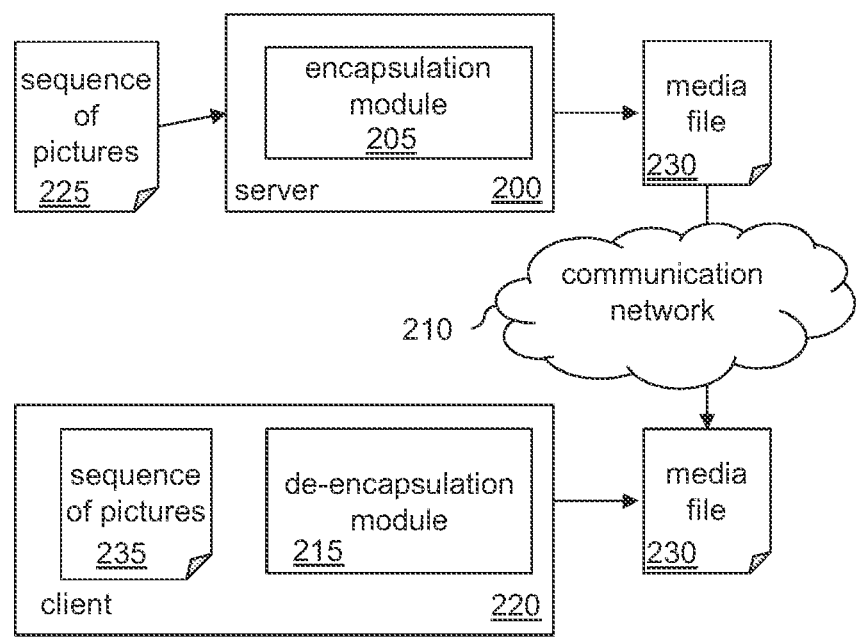
FIG. 2 illustrates a high-level view of embodiments for the encapsulation of a filtered VVC bitstream in media files.

FIG. 2 illustrates a high-level view of the proposed method for the encapsulation of a filtered VVC bitstream in media files. As illustrated, a server 200 comprises an encapsulation module 205, connected, via a network interface (not represented), to a communication network 210 to which is also connected, via a network interface (not represented), a de-encapsulation module 215 of a client 220.

Server 200 processes data, e.g. video and/or audio data, for streaming or for storage. To that end, server 200 obtains or receives data comprising, for example, the recording of a scene by one or more cameras, referred to as a source video. The source video is received by the server as an original sequence of pictures 225. The server encodes the sequence of pictures into media data (i.e. bit-stream) using a media encoder (e.g. video encoder), not represented, and encapsulates the media data in one or more media files or media segments 230 using encapsulation module 205. Media data or bit-stream may contain multiple sequences of pictures 225. Encapsulation module 205 comprises at least one of a writer or a packager to encapsulate the media data. The media encoder may be implemented within encapsulation module 205 to encode received data or may be separate from encapsulation module 205. Encoding may be done as soon as the sequence of pictures 225 is produced (live encoding) or offline. Encapsulation may also be done live or offline. Encapsulation may also consist in a re-encapsulation of a first media file 230 into a second media file. Media file here may consist in one single physical file or in multiple media segment files or movie fragment files. An example of re-encapsulation may consist in fragmentation of a media file or, at the reverse to merge media segments into one media file. Another example of re-encapsulation may consist in filtering or restricting operating points, tracks, layers or sub-layers of a media file. It may also consists in editing the media with new tracks, layers or operating points. Re-encapsulation means that instead of a sequence of pictures 225 as input, the encapsulation module 205 takes as input a first media file and produces a second media file 230 with different characteristics. An application of the embodiments hereafter may consist in generating as second media file a media file in which NAL units for some operating points have been removed from the first media file. To indicate this removal, filtering or restriction, the proposed embodiments may be used in the second media file.

Client 220 is used for processing data received from communication network 210, for example for processing media file 230. After the received data have been de-encapsulated in de-encapsulation module 215 (also known as a parser), the de-encapsulated data (or parsed data), corresponding to a media data bit-stream, are decoded, forming, for example, audio and/or video data that may be stored, displayed or output. The media decoder may be implemented within de-encapsulation module 215 or it may be separate from de-encapsulation module 215. The media decoder may be configured to decode one or more video bit-streams in parallel. As for encoder and encapsulation, the decoding and/or parsing may be done offline or live. Client or server may be user devices but may also be network nodes acting on the media files being transmitted or stored.

It is noted that media file 230 may be communicated to de-encapsulation module 215 in different ways. In particular, encapsulation module 205 may generate media file 230 with a media description (e.g. DASH MPD) and communicates (or streams) it directly to de-encapsulation module 215 upon receiving a request from client 220. The media file 230 may also be downloaded by and stored on the client 220.

For the sake of illustration, media file 230 may encapsulate media data (e.g. encoded audio or video) into boxes according to ISO Base Media File Format (ISOBMFF, ISO/IEC 14496-12 and ISO/IEC 14496-15 standards). In such a case, media file 230 may correspond to one or more media files (indicated by a FileTypeBox 'ftyp'). According to ISOBMFF, media file 230 may include two kinds of boxes, a "media data box", identified as 'mdat' or 'imda', containing the media data and "metadata boxes" (e.g. 'moov' or 'moof') containing metadata defining placement and timing of the media data. In a particular embodiment, the sequence of pictures 225 is encoded, or compressed, according to the Versatile Video Codec specification ISO/IEC 23090-3 or High Efficiency Video Codec specification 23008-2.

While output layer sets, sub-layers and with their dependencies are described in the VPS NALU at bitstream level, in the VVC File Format, different structures allow describing the operating points or the output layer sets of a VVC bitstream and their association to layers ('vopi') or to tracks ('opeg').

According to ISO/IEC 14496-15, "the storage of VVC bitstreams is supported by structures such as a [ . . . ] 'vopi', 'linf' or 'opeg' structures". These structures describe the different operating points ('vopi'), the list of layers and sublayers carried in a track ('linf') or a mapping of tracks to operating points and profile level information ('opeg') according to the information on the layers and sub-layers indicated in the VPS NAL unit of the VVC bitstream. In case a VVC bitstream contains an OPI NAL unit, this indicates that some NAL units filtering (or restriction) has been done. Then, there may be more output layer sets, or operating points, described in the VPS NAL unit than actually present in the VVC bitstream (or encapsulated file). The structures for operation points description in ISO/IEC 14496-15 do not take into account this OPI NAL unit. When present in the bitstream and not considered in the encapsulation, there may be a risk of exposing to players or readers a set of output layer sets or operating points greater than what is actually possible in the media file (because layers or sub-layers may have been removed, when considering the specific OLS or sublayer indicated in the OPI NAL unit. The problem is then the "reliability" or "trustability" of information contained in the structures describing the operation points.

We then propose in a first embodiment an additional structure for operating point information for the encapsulation of multiple VVC layers. The rough idea is to make sure that the encapsulation, through 'linf', 'vopi' or 'opeg' structures (also called descriptors), does not describe operation points or sub-layers for which NAL units are no more available. Adding a new structure does not modify the syntax of the mentioned file format structures. A second embodiment, avoiding the use of another structure, consists in clarifying the semantics of the descriptors for operating points in order to take into account the OPI NALU, for example by indicating that the num_operating_points should correspond to the one deduced by the OPI and VPS NALUs and not necessarily deduced from the VPS NALU only, and that it must correspond to the number of operating points actually present in the bitstream encapsulated into the data file.

A third embodiment consists in annotating descriptors (or structures) describing operating points to indicate whether their corresponding NAL units are still available in the encapsulated media file or not.

A New Structure for Filtered or Recommended Operation Point

As for VPS, there may be more than one OPI NAL unit in a VVC bitstream. As such, the proposed structure, similarly to 'vopi' is a sample group to handle possible variation along time. At the reverse, the 'opeg' is a static structure that may not handle well OPI changes. Considering this, as soon as the bitstream contains more than one OPI NAL unit, the 'vopi' structure is preferred to the 'opeg' structure, especially for live encapsulation and live encoding.

In a first variant, a new sample group is proposed to describe a recommended, restricted or filtered output layer set (or operating point) in a list of output layer sets (or operating points). A specific VisualSampleGroupEntry is defined to provide an indication of the index of the output layer sets available in the set of operating points defined in the 'vopi' sample group. This VisualSampleGroupEntry is used in a SampleGroupDescriptionBox with grouping_type equal to 'ropi' (the four character-code here being just an example, any reserved value, not conflicting with already existing 4cc could be used).

Applications are informed about the recommended or restricted or filtered operating point provided by a given VVC bitstream by using the Restricted Operating Points Information sample group ('ropi'). The recommended or restricted or filtered operating point is indicated as an output layer set index, possibly with an indication of a maximum TemporalId value. The index refers to one of the output layer set index declared in the 'vopi' sample group. This sample group is associated with the 'vopi' sample group and restricts the set of possible operating points declared in the 'vopi' sample group. The information contained in this sample group may also provide the maximum temporal Id within the restricted operating point. Preferably, in multi-track encapsulation, the 'ropi' sample group is contained in the track referred by other tracks via the 'oref' track reference type. In case the media file contains more than one presentation or encapsulates more than one VVC bitstream, each with its own set of operating points, there may be several 'ropi' sample groups in the media file, but each related to a reference track, the one providing the 'vopi' or indicated by a specific track reference type, as for example 'oref'.

A 'ropi' sample group description for a given group of samples always indicate a restriction applying to the operating points declared in the 'vopi' sample group description this group of samples is associated with. For example, there may be a default sample grouping for both 'vopi' and 'ropi' in which case, all the samples of the track containing the 'ropi' and all the samples of the tracks referencing the track containing the 'ropi' sample group follow the filtering or restriction on the same list of operating points. As another example, there may be a default 'vopi' sample grouping (same list of operating points for all the samples of the track) but several 'ropi' entries listed in the SampleGroupDescriptionBox with grouping_type equal to 'ropi', thus indicating that from one group of samples to another, different restrictions apply along time. Another example consists in 'vopi' sample group and 'ropi' sample group that are both non default sample grouping. For example, the media file consists in recording a program made up of movie, adverts and TV shows. Different operating points are defined for each content (movie, advert or TV show) that each may be further constrained by an OPI NALU. In this example, there may be several sample groups associated to different 'vopi' sample group description entries and several sample groups also associated to different 'ropi' sample group description entries.

The proposed syntax for the new VisualSampleGroupEntry is:

```
class RestrictedOperatingPointsInformation extends
VisualSampleGroupEntry ('ropi') {
    unsigned int(16) restricted_output_layer_set_idx;
    unsigned int(3) restricted_highest_temporalID;
    unsigned int(5) reserved;
}
``` with the following semantics restricted_output_layer_set_idx is the 0-based index of the output layer set that corresponds to the output layer set index (opi_ols_idx) indicated in the OPI NAL unit, defined in VVC specification ISO/IEC 23090-3. A reserved or predetermined value indicates that no restriction on output layer set applies to the corresponding group of samples. For example, this value predetermined or reserved value is set to the maximum value of restricted_output_layer_set_idx (or to any higher value) i.e. the maximum number of operating points plus one. In a variant this value is equal to 2 power the length of the syntax element in bits minus one (2^len−1), with len equal to 16 in the above syntax example.

restricted_highest_temporalID is the value of the maximum temporal ID present in the operating point, as indicated in the OPI NAL unit, defined in VVC specification ISO/IEC 23090-3. Its value is equal to opi_htid_plus1 minus one if the opi_htid_plus1 is greater than 0. Otherwise, a reserved or predetermined value opi_htid_plus1=0 implies that no restriction on sublayers applies to the corresponding group of samples. This value also provides the upper bound for the value max_TemporalId in the 'linf' sample group description entry associated to the group of samples for which this restriction on sub-layers is defined. The impacted 'linf' sample group description entries are those contained in tracks referring to the track containing the 'ropi' sample group through a specific track reference type, like for example the 'oref'.

While the above sample group description entry is simple, because reflecting the values from the OPI NAL unit at file format level, default values have to be set when the OPI NAL unit provides only one parameter (opi_ols_idx or opi_htid_plus1). For example, when only opi_htid_plus1 is provided in OPI NALU, a predetermined value is set in restricted_output_layer_set_idx to indicate that there is no restriction on output layer sets. As well, when only opi_ols_idx is provided in OPI NALU, a predetermined value is set in restricted_highest_temporalID to indicate that there is no restriction on sublayers.

In a second variant, the structure of the visual sample group entry exactly reflects the payload of the OPI NALU, with control flags to indicate whether the restriction applies to layers or sublayers or both.

The proposed syntax is:

```
    class         RestrictedOperatingPointsInformation    extends
VisualSampleGroupEntry ('ropi') {
        unsigned int(1) output_layer_set_restriction_flag;
        unsigned int(1) sublayer_restriction_flag;
        unsigned int(3) reserved;
        if (ols_restriction_flag)
            unsigned                                      int(16)
restricted_output_layer_set_idx;
        if (sublayer_restriction_flag)
            unsigned int(3) restricted_highest_temporalID;
        else
            unsigned int(3) reserved;
}
``` with the following semantics output_layer_set_restriction_flag indicates, when set, that a restriction onto the output layer sets defined in the 'vopi' sample group applies to a group of samples. When not set, no restriction applies to the group of samples and any output layer set may be selected by reader or parser for transmission, reconstruction or display.

sublayer_restriction_flag indicates, when set, that a restriction on temporal sublayers is defined for a group of samples. When not set, no restriction applies to the temporal sublayers for the list of operating points defined in the 'vopi' sample group and any temporal level may be selected by parser or reader for transmission, reconstruction or display.

restricted_output_layer_set_idx indicates the index of an output layer set from the list of operating points declared in the 'vopi' for which NAL units are available in the media file. A parser or reader may select this output layer set for transmission, rendering or display. It may correspond to the output layer set index indicated in the opi_ols_idx OPI NAL unit, defined in VVC specification ISO/IEC 23090-3, when it is present in a VVC bitstream.

restricted_highest_temporalID indicates the value of the maximum temporal ID allowed in the operating points listed in the 'vopi' sample group. It may correspond to the value indicated in the OPI NAL unit, defined in VVC specification ISO/IEC 23090-3: the value of opi_htid_plus1 minus one if the opi_htid_plus1 is greater than 0. This value also provides the upper bound for the value max_TemporalId in the Layer information sample group description entries ('linf') associated to the group of samples for which this restriction on sub-layers is defined.

In a third variant, a new sample group is created to describe the list of restricted operating points. With this variant, the 'ropi' sample group is no more a description referencing a 'vopi' sample group but rather an operating point description that overrides or replaces the 'vopi' sample group. This has an impact on parsers and readers. When present in a media file, the 'ropi' sample group should be considered by parsers or readers to select an output layer set to transmit or play instead of the 'vopi' sample group. According to this embodiment, when both 'vopi' and 'ropi' co-exist in a media file, the 'vopi' should be considered as non-reliable and 'ropi' should be used instead.

It is to be noted that most of the parameters in this sample group description entry are identical to the ones in 'vopi'. Only those in bold correspond to changes in syntax and semantics of the 'vopi'. Moreover, some useless fields from the 'vopi' have been removed (strikethrough fields). Indeed, repeating these fields from the VPS does not bring anything, since each operating point is exhaustively described afterwards. It is to be noted that, following the same principle, the 'vopi' structure could also be simplified.

```
class RestrictedOperatingPointsInformation extends
VisualSampleGroupEntry ('ropi') {
    unsigned int(8) num_profile_tier_level_minus1;
    for (i=0; i<=num_profile_tier_level_minus1; i++) {
        unsigned int(8) ptl_max_temporal_id[i];
        VvcPTLRecord(ptl_max_temporal_id[i]+1) ptl[i];
    }
    unsigned int(16) num_ restricted_operating_points;
    for (i=0; i < num_ restricted_operating_points) {
        unsigned int(16) restricted_output_layer_set_idx;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
            bit(1) reserved = 0;
        }
        bit(6) reserved = 0;
        unsigned int(1) frame_rate_info_flag
        unsigned int(1) bit_rate_info_flag
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
    }
    unsigned int(8) max_layer_count;
    for (i=0; i<max_layer_count; i++) {
        unsigned int(8) layerID;
        unsigned int(8) num_direct_ref_layers;
        for (j=0; j<num_direct_ref_layers; j++)
            unsigned int(8) direct_ref_layerID;
        unsigned int(8) max_tid_il_ref_pics_plus1;
    }
}
```

Where num_restricted_operating_points gives the number of operating points for which the information follows. The number of operating points may correspond to the number of output layer sets deduced from the VPS and the OPI NAL units.

restricted_output_layer_set_idx is the index of the output layer set that defines the operating point. The mapping between output_layer_set_idx and the layer_id values shall be the same as specified by the VPS after filtering or restriction indicated in an OPI NAL unit for an output layer set with index output_layer_set_idx.

max_temporal_id gives the maximum TemporalId of NAL units of this operating point as indicated in the VPS after filtering or restriction indicated in an OPI NAL unit. When no filtering or restriction is indicated in an OPI NAL unit (opi_htid_info_present_flag=0 or opi_htid_plus1=0), it corresponds to the maximum temporal ID deduced from the VPS. This value shall correspond to the opi_htid_plus1 minus one. This value also provides the upper bound for the value max_TemporalId in the 'linf' sample group description entries associated to the group of samples for which this restriction on sub-layers is defined.

The semantics for the other fields are unchanged compared to 'vopi' structure. This sample group is an alternative to a 'vopi' constructed by considering VPS and NAL unit according to the second embodiment. However, this embodiment makes media file editing easier, adding this new sample group each time an OPI NALU occurs in the bitstream and allows the 'vopi' structure to remain aligned with the VPS NAL unit.

For the different variants in this first embodiment, the new sample group for restricted operating points may also be used when an existing movie file is filtered by an application providing a target output layer set and/or a target highest temporal ID. The filtered media file may be stored without filtered NAL units having layer ID that is not in the target output layer set and/or without NAL units having a temporal ID greater than the target highest temporal ID, with the original 'vopi' sample group and with this 'ropi' sample group to indicate the filtering or restriction applied to the media file. Advanced parsers may use such indication to build a VPS NALU describing the filtered NAL units and provide it to a video decoder. Less advanced parsers may simply push initial VPS plus an OPI NAL unit indicating the filtering to a video decoder. Some applications like media file inspector or robust parsers may check the consistency of media file in terms of consistency between operating point description and actual NAL units present in this media file. For example, if the maximum temporal ID that can be deduced by parsing NAL unit header is lower than the greatest one declared for any operating point in the file, the file inspector may generate a structure for restricted operating point like the 'ropi' sample group to indicate restriction on temporal sublayers. As well for layer IDs, if the parsing of NAL unit header indicate a maximum layer ID that is different than the greatest one declared for any operating point, the index of the corresponding output layer set using this determined maximum layer ID may be declared in a restricted operating point information according to one of the above variants. Robust parsers identifying similar issues on maximum layer ID or maximum temporal ID may produce a reliable bitstream in terms of operating points declaration by adding an OPI NAL unit in the bitstream resulting from the parsing. This OPI NAL unit would contain the determined values for maximum temporal ID or maximum layer ID actually used by the NAL units encapsulated in the media file and present in the bitstream resulting from the parsing.

Figure 3:
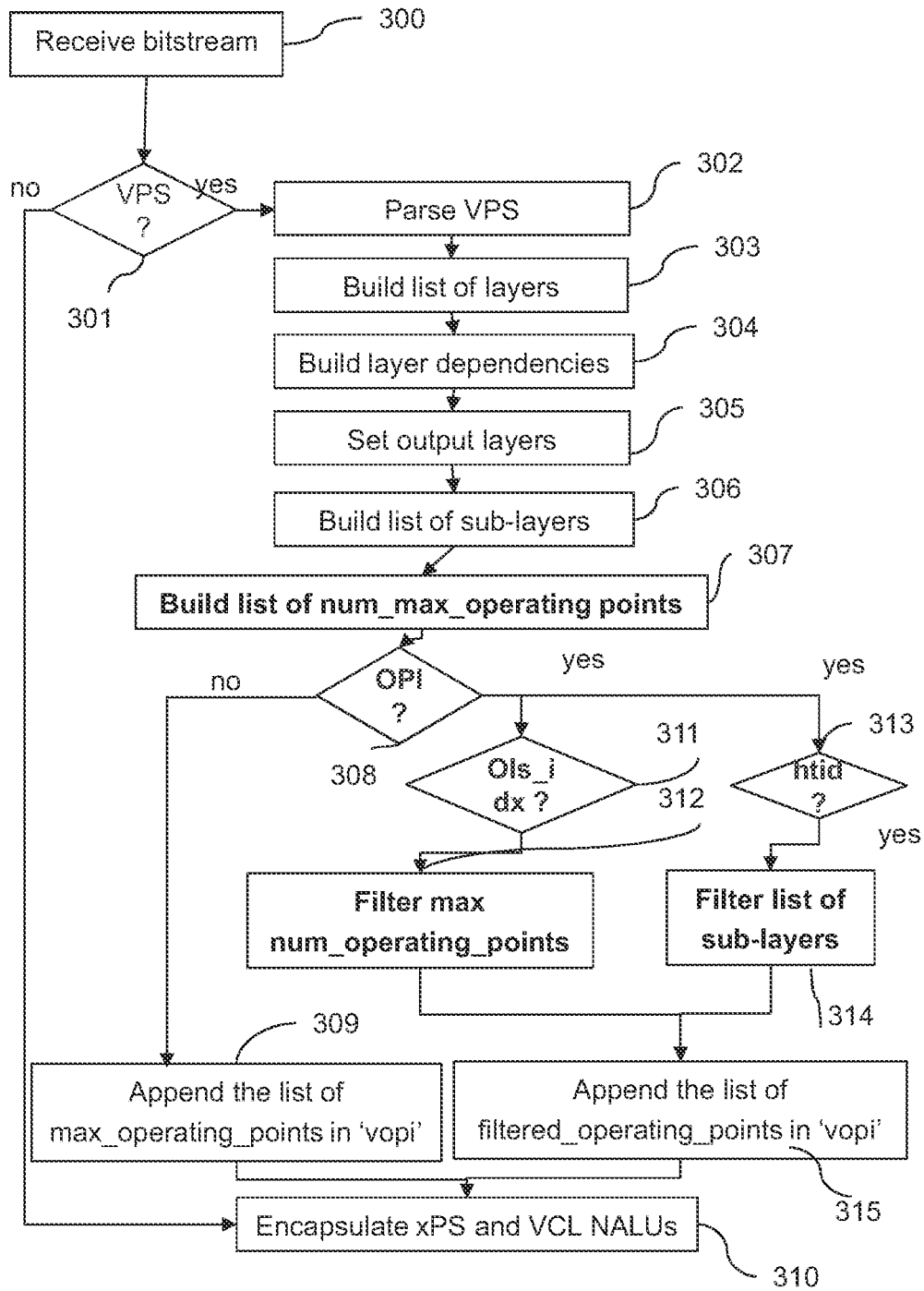
FIG. 3 illustrates how the 'vopi' sample group is created according to an embodiment of the present disclosure.

Changing the semantics of existing operating point descriptors FIG. 3 illustrates how the 'vopi' sample group is created according to an embodiment of this proposed method. This embodiment of the proposed method is characterized in that encapsulation module relies not only on the VPS information but also on the OPI NALU when present in a VVC bitstream to build a list of valid operating points. In other words, the encapsulation module filters some of the output layer sets declared in the VPS according to OPI NAL unit indication. This embodiment is suitable for a first encapsulation, when no 'vopi' or operating point descriptor structure has been generated already. For editing an already encapsulated media file, or when 'vopi' or operating point descriptor structure has been generated already, the first or third embodiments may be preferred.

In Step 300, the encapsulation module receives a bitstream to encapsulate. In step 301, it looks for a Video Parameter Set NAL unit. If no VPS is present, there are no multiple layers, then no description of operating points is required (like for example 'vopi' or 'opeg') and the encapsulation module considers next NAL units in 310. If VPS NALU is detected in 301, the encapsulation module parses the VPS fields in 302. It gets the number of layers and allocates a table to store the layers with their description in 303. It reads from the payload of the VPS NAL units the dependencies of each layer and stores the referenced layers in the allocated table during 304. In 305, it reads the information on which layers are output layers and records this information in the allocated table. Then, it gets information on the number of sublayers in 306 and records it into the allocated table. From the recorded information, the encapsulation module deduces a maximum number of operating points (or output layer sets) in step 307. This may depend on a combination of VPS flags like vps_all_independent_layers_flag, vps_each_layer_is_an_ols_flag, vps_ols_mode_idc or given in the list of vps_ols_output_layer_flags. Then, the encapsulation module gets next NAL unit and checks whether it is an OPI NAL unit in test 308. If none can be found, then a 'vopi' is created to describe the number of operating points as the maximum number of operating points deduced from VPS NAL unit in 309 and keeps on processing the bitstream in 310. If an OPI NAL unit is present, then the encapsulation module checks whether indication of an output layer set index is present in 311 and if indication of a highest temporalID is also present in the OPI NAL in 313. When first test 311 is true, the encapsulation module filters the list of the maximum number of operating points determined in 307 according to indication in opi_ols_idx in 312 (indeed, some operating points may be a subset of the operating point with index equal to opi_ols_idx and are thus also accessible). When test 313 is true, the maximum number of sublayers is updated with the indication in opi_htid_plus1 field of the OPI NAL unit in 314. Then, in 315, a 'vopi' sample group description entry is constructed with the filtered number of operating points (or output layer sets). And the encapsulation module keeps on parsing the NAL units to build track and sample description. The filtering step 312 depends on the layer configuration, for example as illustrated on FIGS. 1a and 1b. For example on FIG. 1a, when each layer is independent, and each layer indicated as an output layer, there may be a one to one mapping between an OLS and a layer. The filtering is then easy, consisting in keeping the layer, and then OLS, corresponding to the OLS index given in the OPI NAL unit. When there are dependencies between layers, as for example on FIG. 1b, the filtering may result in more than one OLS. For example indication of an opi_ols_idx=2 with configuration of FIG. 1b will lead to 2 OLS: the OLS with index 2 containing layer 1 and layer 0 and the OLS with index 1 containing only the layer 0. In case of layer dependencies, the filtering step 312 explores the list of layer dependencies and collects the layers involved in the OLS. From this obtained set of layers, some subsets may also correspond to a possible OLS, then inserted in the list of filtered OLS. For sub-layer filtering in 314, the encapsulation module keeps in memory the highest temporal ID given by the OPI NAL unit and uses it in the description of operating points as their max_temporal ID.

According to one embodiment, the semantics for the VvcOperatingPointsRecord structure used in 'vopi' sample group description entries is modified as follows:

num_operating_points: Gives the number of operating points for which the information follows. The number of operating points may correspond to the number of output layer set deduced from the VPS NAL unit or from the VPS and the OPI NAL units when OPI is present.

output_layer_set_idx is the index of the output layer set that defines the operating point. The mapping between output_layer_set_idx and the layer_id values shall be the same as specified by the VPS for an output layer set with index output_layer_set_idx.

max_temporal_id: Gives the maximum TemporalId of NAL units of this operating point as indicated in the VPS. When an OPI NAL unit is present, this value shall correspond to the opi_htid_plus1 minus one.

layer_count: This field indicates the number of necessary layers, as defined ISO/IEC 23090-3, of this operating point. When an OPI NAL unit is present, no layers than those included in the OLS with OLS index equal to opi_ols_idx should be counted.

max_layer_count: The count of all unique layers in all of the operating points that relate to this associated base track. When an OPI NAL unit is present, no layers other than those included in the OLS with OLS index equal to opi_ols_idx shall be counted.

FIG. 3 describes the filtering of operating points at the beginning of the bitstream, but the encapsulation module within step 310 may check whether a new OPI NALU is present and may filter again the maximum number of operating points according to steps 312 or 314 to produce a new 'vopi' sample group description entry. As a consequence, when several VPSs are referenced by a VVC bitstream, or when a VVC bitstream contains several OPI NAL units, it may be needed to include several entries in the sample group description box with grouping_type 'vopi'. For more common cases where a single VPS or OPI is present, it is recommended to use the default sample group mechanism defined in ISO/IEC 14496-12 and include the operating points information sample group in the sample table box, rather than including it in each track fragment.

As well, the linf sample group may be impacted by the presence of OPI NALU in the VVC bitstream, when the OPI NALU contains indication on the highest temporal ID. Then, when several VPSs are referenced by a VVC bitstream, or when a VVC bitstream contains several OPI NAL units, it may be needed to include several entries in the sample group description box with grouping_type 'linf'. For more common cases where a single VPS or OPI is present, it is recommended to use the default sample group mechanism defined in ISO/IEC 14496-12 and include the Layer Information sample group in the sample table box, rather than including it in each track fragment.

According to this embodiment, the 'vopi' sample group provides reliable information to parsers or readers because operating points for which NAL units are no more available are no more listed and described in the 'vopi' sample group. Parsers and readers may safely select one of the operating points listed on the 'vopi' for transmission, rendering or display.

In addition to the construction of a reliable 'vopi', when the encapsulation module has knowledge on the whole bitstream (e.g. offline encapsulation) and that there is no multiple filtering of output layer sets in the bitstream, the 'opeg' structure may be preferred to the 'vopi' and the same filtering mechanism may also apply (i.e. filtering the output layers sets). The semantics for 'opeg' is then updated as follows:

num_operating_points: Gives the number of operating points for which the information follows. The number of operating points may correspond to the number of output layer set deduced from the VPS NAL unit or from the VPS and the OPI NAL units when an OPI NAL unit is present.

max_temporal_id: Gives the maximum TemporalId of NAL units of this operating point as indicated in the VPS. When an OPI NAL unit is present, this value shall correspond to the opi_htid_plus1 minus one, if greater than 0.

layer_count: This field indicates the number of necessary layers, as defined ISO/IEC 23090-3, of this operating point. When an OPI NAL unit is present, no layers than those included in the OLS with OLS index equal to opi_ols_idx shall be counted.

Changing the Syntax, and Semantics, of Existing Point Descriptors

The 'vopi' sample group informs applications about the different operating points provided by a given VVC bitstream. The metadata structure VvcOperatingPointsRecord contained in the 'vopi' sample group description describes the operating points as profile tier level, number of layers, maximum temporal ID, etc. . . . reflecting information from the VPS NALU. However, this description does not indicate a "preferred", "default", "recommended" or filtered operating point to the application, even if this information is present in the VVC bitstream, through the OPI NAL unit.

In this embodiment, a modification in the metadata structure for the 'vopi' sample group indicates in the list of operating points which one corresponds to a recommended output layer set when this information is available in the bitstream (with changes in bold), compared to the existing 'vopi' structure.

In a first variant the syntax may become:

```
class VvcOperatingPointsInformation extends
VisualSampleGroupEntry ('vopi') {
    VvcOperatingPointsRecord oinf;
}
class VvcOperatingPointsRecord {
    unsigned int(8) num_profile_tier_level_minus1;
    for (i=0; i<=num_profile_tier_level_minus1; i++) {
        unsigned int(8) ptl_max_temporal_id[i];
        VvcPTLRecord(ptl_max_temporal_id[i]+1) ptl[i];
    }
    unsigned int (1) all_independent_layers_flag;
    bit(7) reserved = 0;
    if (all_independent_layers_flag){
        unsigned int(1) each_layer_is_an_ols_flag;
        bit(7) reserved = 0;
    } else
        unsigned int(8) ols_mode_idc;
    unsigned int(16) num_operating_points;
    for (i=0; i<num_operating_points) {
        unsigned int(9) output_layer_set_idx;
        unsigned int(1) recommended_ols_flag;
        if (recommended_ols_flag) {
            unsigned int(3) recommended_htid;
            unsigned int(3) reserved;
        } else
            unsigned int(6) reserved;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
```

```
            bit(1) reserved = 0;
        }
        // remaining parts unchanged
    }
}
``` with recommended_ols_flag that indicates, when set, that the output layer set index corresponds to the target output layer set to decode as indicated in the OPI NAL unit. This operating point may be selected as a target output layer set to decode. When not set, the corresponding output layer set may not have all its NAL units present in the media file and should not be selected as a target output layer set to decode. recommended_htid indicates the highest temporal sub layer to decode for this output layer set, as indicated in the OPI NAL unit. When present, this value overrides the value of max_temporal_id to indicate the highest temporal sublayer available for an operating point.
The semantics for the other parameters are unchanged compared to the existing 'vopi'.

In a second variant the syntax changes are slightly different because two new flags are used to consider both OLS and temporal sublayer filtering or restriction, as indicated by an OPI NAL unit. This variant is expressed as follows in the structure for the 'vopi' sample group:

```
class VvcOperatingPointsRecord {
    unsigned int(8) num_profile_tier_level_minus1;
    for (i=0; i<=num_profile_tier_level_minus1; i++) {
        unsigned int(8) ptl_max_temporal_id[i];
        VvcPTLRecord(ptl_max_temporal_id[i]+1) ptl[i];
    }
    unsigned int(1) all_independent_layers_flag;
    bit(7) reserved = 0;
    if (all_independent_layers_flag){
        unsigned int(1) each_layer_is_an_ols_flag;
        bit(7) reserved = 0;
    } else
        unsigned int(8) ols_mode_idc;
    unsigned int(16) num_operating_points;
    for (i=0; i<num_operating_points) {
        unsigned int(9) output_layer_set_idx;
        unsigned int(1) restricted_ols_flag;
        unsigned int(1) restricted_sublayer_flag;
        if (restricted_sublayer_flag) {
            unsigned int(3) restricted_htid;
            unsigned int(2) reserved;
        } else
            unsigned int(5) reserved;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
            bit(1) reserved = 0;
        }
        // remaining parts unchanged
    }
``` with restricted_ols_flag that indicates, when set, that the output layer set index corresponds to a decodable target output layer set as indicated in the OPI NAL unit, in particular with the opi_ols_ix parameter. This operating point may be selected as a target output layer set to decode by readers or parsers. When not set, the corresponding output layer set or operating point may not have all its NAL units present in the media file and should not be selected as a target output layer set to decode by readers or parsers.

restricted_sublayer_flag indicates, when set, that a restriction has been set on temporal sublayers, as indicated by an OPI NAL unit, in particular with the opi_htid_plus1 parameter, when it is greater than 0. When opi_htid_plus1 equals 0, the restricted_sublayer_flag flag is not set. When not set, no restriction is set on the sub-layers for this operating point and max_temporal_id value can be safely used.

restricted_htid indicates the highest temporal sub layer to decode for this output layer set, as indicated in the OPI NAL unit. This value corresponds to the value of opi_htid_plus1 minus one. When present, this value overrides the value of max_temporal_id to indicate the highest temporal sublayer available for an operating point.

The semantics for the other parameters are unchanged compared to the existing structure for 'vopi' sample group.

The two above variants illustrate one or two control flags for indication in an initial list of operating points some constraints or restrictions for some of them and possibly new values to consider for some parameters of a restricted operating point (like the maximum temporal ID for example). This overriding mechanism has the advantage that it is easy to edit or update an existing 'vopi' when an original bitstream gets filtered or transmitted. The 'vopi' is described once for all and some restrictions, that may change along the bitstream, may be set/unset just by control flags and overriding values. Additional variants may consider more control flags and overriding values when the parameters of an operating point would be impacted by a restriction or a filtering of the bitstream. It is to be noted that a control flag indicating whether the 'vopi' contains restrictions or not may be placed higher in the 'vopi' structure, i.e. before the loop on the operating points, for example using reserved bits.

This embodiment, with its variants, allows explicit indication, in existing operating point descriptors of a subset of operating points or output layer sets for which all NAL units are available in the one or more encapsulated tracks representing this (or these) operation points or output layer sets. The control flags added in the variants take into account the filtering or restriction indicated by OPI NAL units. When an OPI NALU occurs in the bitstream, a new VisualSampleGroupEntry of type 'vopi' is inserted in the sample group description box of type 'vopi', this new sample group entry provides the new set of flags and possibly overriding values for the restriction or filtering described in the OPI NALU. By doing so, the 'vopi' always contains reliable indication to parsers or readers on operating points and availability of their corresponding NAL units.

The same modification (control flags and overriding values) may apply to the 'opeg' structure. In case the filtering is done on an already encapsulated file, the 'opeg' structure is modified, a restriction_flag is added, to indicate whether the 'opeg' still applies to the media file or not:

```
aligned(8) class OperatingPointGroupBox extends
EntityToGroupBox('opeg',0,0)
{
    unsigned int(8) num_profile_tier_level_minus1;
    for (i=0; i<=num_profile_tier_level_minus1; i++)
        VvcPTLRecord(0) opeg_ptl[i];
    unsigned int(1) restriction_flag;
    unsigned int(15) num_operating_points;
    for (i=0; i<num_operating_points) {
        unsigned int(16) output_layer_set_idx;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
```

-continued

```
        bit(1) reserved = 0;
    }
    bit(6) reserved = 0;
    unsigned int(1) frame_rate_info_flag
    unsigned int(1) bit_rate_info_flag
    if (frame_rate_info_flag) {
        unsigned int(16) avgFrameRate;
        bit(6) reserved = 0;
        unsigned int (2) constantFrameRate;
    }
    if (bit_rate_info_flag) {
        unsigned int(32) maxBitRate;
        unsigned int(32) avgBitRate;
    }
    unsigned int(8) entity_count;
    for (j=0; j<entity_count; j++) {
        unsigned int(8) entity_idx;
    }
  }
}
```

Where restriction_flag, when set indicates that the initial 'opeg' may not be reliable, following a filtering or a restriction on OLS, possibly indicated by an OPI NALU. This indicates that some operating points may not be correctly reconstructed. When not set, it indicates that all the operating points may be selected and rendered.

For the above embodiments in which restricted or filtered list of operating points and complete list of operating points are described in different structures of a media file, the encapsulation module may decide to keep the OPI NAL unit(s) in the set non-VCL NAL units. This can be done using the NAL unit arrays of the decoder configuration record in 'vvcC' box, or in samples of a parameter set track, or in samples of a track, for example the one declaring the 'vopi', 'opeg' or 'ropi'. In such case, it is recommended that the arrays be in the order DCI, VPS, OPI, SPS, PPS, prefix APS, prefix SEI. This set of NAL unit arrays carry initialization NAL units. The NAL unit types are restricted to indicate DCI, VPS, OPI, SPS, PPS, prefix APS, and prefix SEI NAL units only.

In the above embodiments in which, the structures describing the operating points take into account the filtered or restricted list of operating points, the encapsulation module may decide to skip the OPI NAL unit from the parameter set or non-VCL NAL units. This may be used in configuration where the application, getting information from the media file is able to control the decoder to indicate the target output layer set and the highest temporal ID to decode.

The above embodiments may also apply to re-encapsulation, For example, from a user interface or from application settings, the list of initial operating points (e.g. read from 'vopi' or 'opeg') described in the input media file is obtained. A user through a user interface or an application through predefined settings removes NAL units corresponding to some operating points or sublayers, based on layer ID or temporal ID fields in the NAL unit header. For example, NAL units corresponding to operating points requiring too high profiles or levels or too high framerates for the application may be filtered. The so-edited media file is saved into a second media file 230 containing in its medata part indication of the restricted or filtered operating points (e.g. 'ropi' or 'vopi' with additional syntax or semantics).

Indication for Default Track

The indication of a default track may be done at track level.

When one bitstream containing multiple OLSs is encapsulated as a single track or when one track contains an OLS with index equal to the one indicated in an OPI NAL unit, this track may be explicitly indicated as the default track for media players. There should be at most one track marked as the default track for a given media handler. For video bitstream, the media handler is 'vide' indicating a video track. For such indication, the track header box is extended with a new flags value:

track_is_default: When set, indicates that this track can be considered as the default track to present. Flags value is 0x000010. There should be only one track, for a given handler type, having this flag set. A track with this flags value set shall also have track_enabled and track_in_movie also set. Any value may be used as soon as it does not conflict with other track header flags value already in use.

It is noted that when a bitstream contains an indication or when the encapsulation receives information by external means (user interface, configuration, application . . . ) for a recommended track among a set of tracks with the same media type, this track may have this new flags value set. Parsers encountering media files with a track having this flags set may select this track as the default track for play. Having such a flags allows a parser to rapidly select a track without the need to further inspect ISOBMFF structures in the file.

When the version or the brand of an ISOBMFF file does not offer the track_is_default flags value, such track may have its track_in_movie set to 1. For example, a track that directly contains an operating point, or output layer set, authorized by an OPI NAL unit shall have the flags track_in_movie set in its track header box. This allows media parsers or readers to easily identify a track to select and play, in particular when no indication on track relationships or selection criteria is provided. On the contrary, a track encapsulating an output layer set that has been indicated as filtered by an OPI NALU may have its track_in_movie flags set to 0, or even track_enabled flags set to 0.

Alternatively, or in addition to the new track header flags, a set of tracks providing alternative operating points for a same video may be indicated as being part of alternative tracks in their track header box using the same value in their alternate_group field, different than 0 which is reserved. To differentiate the tracks within this alternate group, the track selection may indicate, for each track in the set that they are part of a switch group by setting the value of the switch_group field to the value of the track header's alternate_group. Moreover, the track selection box uses a new differentiating attribute: "Operating Point Index" or "Output Layer Set Index" indicated by a reserved four character code 'olsi' (the 4cc is here just an example, any other 4cc not conflicting with already registered 4cc may be used for this purpose) the index of operating point or output layer set to which the track corresponds to. The set of descriptive attributes may also be extended with a new attribute: "Operating Point Information Selection' or "Output Layer Set Selection" indicated by a reserved four-character code 'olss' (the 4cc is here just an example, any other 4cc not conflicting with already registered 4cc may be used for this purpose). This new descriptive attribute indicates that the track in the switch group are different operating points for a same content. The track selection may contain additional differentiating attribute to indicate the difference between the operating point, for example scaling in terms of quality, using 'cgsc' or temporal scalability with 'tesc'.

Indication of a Track with Multiple Output Layers

VVC specification allows one output layer set to possibly contain more than one output layer. When such VVC bitstream is encapsulated in a single track, there is a need for description of the purpose of these multiple output layers.

In a first variant, it is possible to use a 'vopi' or 'opeg' structure. For previous codecs like MVC, SVC, HEVC, several sample entry types like for example 'mvc1' for multiview, 'svc1' or 'lhv1' for scalability allowed to understand the purpose of the tracks. The VVC File format limits the number of samples entry types, so they can't help in identifying a purpose for the multiple output layers. Indeed, a track with a single layer or a track containing an output layer set with multiple layers may have the sample entry 'vvc1', for example. When a single track contains more than one output layer, a parser or reader may need a structure describing the output layer sets to help or inform applications on the use of such track and corresponding decoded pictures.

We then propose to add a 'vopi' sample group or an 'opeg' structure for such VVC tracks as proposed hereafter, to amend the ISO/IEC 14496-15: When a VVC bitstream is encapsulated as one VVC track and the output_layer-_set_idx declared in the VVC Decoder Configuration Record of this VVC track refers to an output layer set including more than one output layer, a 'vopi' sample group or an 'opeg' entity group should be present. Indeed, without a 'vopi' or 'opeg' boxes the VVC Decoder Configuration Record Box is not sufficient to determine the number of output layers present in the OLS described in the VVC Decoder Configuration Record Box.

As an alternative to mandate a 'vopi' or 'opeg' to be present for tracks containing at least one OLS with more than one output layers, the VVC DecoderConfigurationRecord is modified (in bold) as follows:

```
aligned(8) class VvcDecoderConfigurationRecord {
    unsigned int(8) configurationVersion = 1;
    unsigned int(16) avgFrameRate;
    unsigned int(2) constantFrameRate;
    unsigned int(3) numTemporalLayers;
    unsigned int(2) lengthSizeMinusOne;
    unsigned int(1) ptl_present_flag;
    if (ptl_present_flag) {
        VvcPTLRecord(numTemporalLayers) track_ptl;
        unsigned int(9) output_layer_set_idx;
        unsigned int(7) num_output_layers;
    }
    // remaining fields are unchanged    }
}
``` where num_ouput_layers indicates the number of output layers contained in the track.

When such single track encapsulation further encapsulates a bitstream that has been filtered or restricted in terms of output layer sets or sublayers, this track may contain:
- a 'ropi' sample group in addition to the 'vopi' or 'opeg'
- a 'vopi' or 'opeg' constructed according to the steps in FIG. 3
- a 'vopi' or 'opeg' with updated syntax and semantics indicating which operating points are filtered or restricted.

According to a second variant, new samples entry types may be used. To explicitly indicate that a VVC track encapsulates more than one output layer, a new sample entry type is used, for example 'lvc1' or 'vvc1', for VVC track with multiple output layers. Samples of a track with a 'lvc1' (or 'vvc1') sample entry type consist in one or more layer components, possibly leading to more than one decoded pictures for output (having their PictureOutputFlag set to 1) when the corresponding NAL units are given to a video decoder. These new sample entries may be declared within an OriginalFormatBox within a RestrictedSchemeInfoBox provided that a SchemeTypeBox and a SchemeInformationBox indicate what to do with these multiple components. If no such scheme is defined, these new sample entries may be declared in the sample description box. Some scheme examples may be assembling of stereo pairs, spatial composition of decoded pictures . . . .

According to a third variant, a limited set of sample entry types may be used. An alternative to the proliferation of sample entry types consists in keeping a limited set for VVC tracks, but to put constraints on the mapping of layers to VVC tracks, in particular on the mapping of output layers to tracks. A constraint can be defined to VVC storage with multiple layers. The ISO/IEC 14496-15 AMD 2 allows different mapping of layers to tracks.

The proposed restriction consists, for individual tracks containing one or more layers, to avoid or forbid an individual track to contain more than one output layer for a given OLS. In other words, an individual track containing one or more layers should contain at most one output layer per OLS contained in this track.

Figure 4:
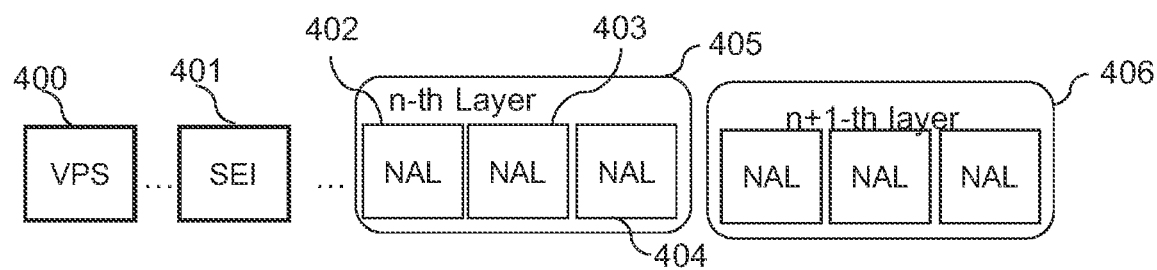
FIG. 4 illustrates an example of VVC bitstream.

FIG. 4 illustrates an example of VVC bitstream. A video bitstream generated by a video coder, typically a VVC encoder may generate a bitstream that comprises two or more independent layers. Each of these independent layers may have different coding parameters. For example, the FIG. 4 illustrates an exemplary bitstream composed of NAL units (e.g. 400 to 404) that encode two (or more) independent layers. The bitstream comprises a set of NAL units that correspond to each layer. For instance, the NAL unit header may include an identifier of layers that permits to distinguish the NAL units that correspond to a given layer. For instance, the headers of the NAL units 402 to 404 comprise a layer id corresponding to the n-th layer 405 of the bitstream of the FIG. 4.

NAL units of another layer follow these NAL units and comprise another layer id corresponding to the n+1-th layer 406.

A decoder is able to decode each of these independent layers. In particular, a VVC bitstream may define output layer sets that comprise two or more independent layers, each independent layer being an output layer. Typically, the output layer sets are signalled in the VPS NAL unit 400 as per VVC specification. Optionally, the VPS NAL unit may be followed by an OPI NAL unit (not represented).

In such a case, the VVC bitstream may also include an SEI message (e.g. 401 in FIG. 4) that describes a composition of the decoded picture. Typically, an SEI message makes it possible for a decoder to determine the position of the layer in the picture resulting from the composition. For instance, the syntax of JVET-S0213 "AHG8/AHG9: Refinement of proposed positioning information SEI message of output independent layers with example bitstreams, E. Thomas" or of JVET-S0107 "AHG9/AHG12: Recommended multi-layer composite picture SEI messages, J. Boyce" can be used. The SEI message may define parameters that relate to the whole composition, such as the size of composition picture, or that pertain to a single layer, such as positioning information in the composition. In the former case, the layer identifier of SEI message NAL unit may correspond to the lowest layer (e.g. the first layer in decoding order) or to a predetermined reserved value (e.g. 0). In the latter case, the layer identifier value corresponds to the concerned layer. For example, the NAL 402 is an SEI message that provides composition information related to the n-th layer.

In VVC specification, support of SEI messages is optional. For this reason, some conformant decoders may not take into account the content of the composition described in the SEI message. On the other hand, a decoder that supports these SEI messages may parse and process them to generate the pictures of the composition from the set of decoded pictures corresponding to each independent layer of the output layer set.

The proposed methods address the encapsulation of such kind of bitstreams in ISOBMFF format and its extension for carriage of NAL unit structured video. In particular, it is proposed generation and parsing methods of ISOBMFF file that permits to determine the composition suggested by the SEI messages present in the VVC bitstream without having to parse the content of the SEI composition messages. Providing format-agnostic description for composition information avoids media players or parsers to implement format-specific parsing (to understand SEI messages for example).

It has to be noted, that the generated media file does not necessarily contain a track that would represent the composition i.e. a base track referencing several tracks that describe one or more layers of a VVC bitstream.

Figure 5:
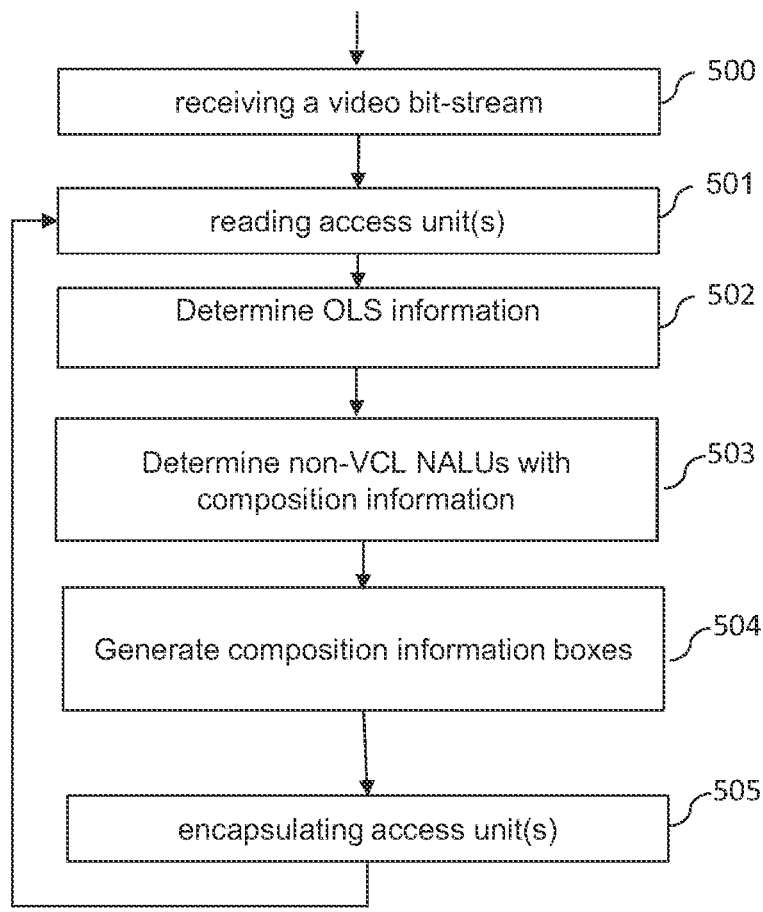
FIG. 5 illustrates an example of an encapsulation process according to embodiments of the present disclosure.

FIG. 5 illustrates an example of an encapsulation process according to embodiments of the proposed method. In a first step 500, the File Format or media file writer (e.g. encapsulation module 205) receives the video bitstream, for instance a VVC bitstream as represented with reference to the FIG. 1 or FIG. 4 to process. The encapsulation process consists in applying a processing loop for each Access Unit of the video bitstream. In particular, the encapsulation module parses the NAL units in a step 501. It determines the output layer sets described in the bitstream in a step 502. For VVC bitstream, this information is typically encoded in the VPS NAL units and possibly in OPI NAL units when present. The writer deduces the operating points from the OLSs described in the bitstream. For instance, the writer may associate one operating point to each OLS described in the VPS. During this determination step 502, the writer also determines the presence of one or more independent layer in OLSs and when applicable if they are output layers.

Step 503 determines if the access unit includes composition information that indicates multiple independent layers, belonging to the same OLS, being part of a recommended composition. For VVC, it consists in parsing the SEI messages (when present) that signal the position of the decoded picture of a layer in the composition picture. In addition, these SEI messages may provide optional transformations (scaling, upsampling or downsampling, rotation, etc.) that apply to each decoded picture or composition picture. It has to be noted that different composition pictures may be defined for each OLS and that a single layer may be part of multiple OLSs. As a result, the writer associates the composition information determined from the SEI messages to each OLS.

From the composition information associated to the OLSs of the bitstream, the writer generates, in a step 504, composition information to be signalled in different boxes of the ISOBMFF output media file. Several embodiments are described to signal this information at different locations of the media file. In some embodiments, the writer associates the composition information to specific operating points of the ISOBMFF file according to the information determined in step 503.

Finally, the process encapsulates the NAL units of the Access Unit in one or more tracks. Typically, when more than one tracks are used, called multi-track encapsulation, the encapsulation process is not necessarily defining a track that would represent the composition, sometimes called a base track.

Figure 6:
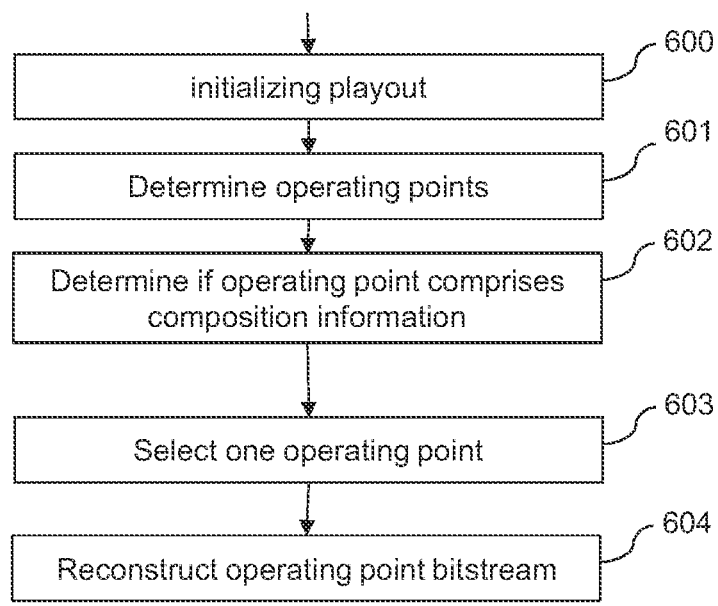
FIG. 6 illustrates an example of the main steps of a parsing process according to an embodiment of the present disclosure.

FIG. 6 illustrates an example of the main steps of a parsing process according to an embodiment of the proposed method. According to this embodiment, the media file contains composition information for a given operating point.

As illustrated, a first step is directed to initializing a media player (e.g. 220) to start reading a media file encapsulated according to the present disclosure in a step 600. Next, the media player determines, in a step 601 the list of operating points described in the media file. Typically, the media player parses the VvcOperatingPointsRecord ('vopi') or OperatingPointGroupBox ('opeg') boxes. These operating points are indicative of the decoding possibilities for the video bitstream.

In one embodiment, the media file includes composition information in some ISOBMFF structure. This composition information is associated to an operating point and makes it possible to determine whether the NAL units encoding the pictures in the operating point include information describing a composition of multiple independent layers. During step 602, the player determines the presence of such information. In some embodiments, the composition information is represented for each output layer and each output layer set described in the VvcOperatingPointsRecord, ('vopi') OperatingPointGroupBox ('opeg') or VvcDecoderConfigurationRecord boxes or structures.

Based on the information determined in step 601 and 602, the media player can identify the operating points that include multiple independent layers with a composition information encoded in non-VCL NAL units. Based on the decoding capacities and support of the processing of these non-VCL NAL units, the player filters the list of operating points that are selectable in step 603. For instance, a media player may ignore the operating points that are associated with composition information (at file format level) when the video decoder in charge of decoding the bitstream is not capable of parsing and processing the composition information present in the non-VCL NAL units, typically in SEI NAL units. In another example, if the composition described in the composition information is not adapted to the media player display or to the user's preferences it may also ignore the operating point and then select a better operating point option in 603. On the other hand, if the decoder supports the non-VCL information that describes the composition, the player may select the operating point.

The final stage 604 of the media player process consists in forming the reconstructed bitstream that corresponds to the selected operating point. In particular, the reconstructed bitstream may include the non VCL NAL units with the composition information, for example contained in NAL unit 401 according to FIG. 4.

Different embodiments of a method for describing a composition in an ISOBMFF file are now described.

Extension of Existing Sample Group Entry Box

In a first variant, it is proposed to extend the RectangularRegionGroupEntry ('trif') box defined in ISO/IEC 14496-15 for describing a composition of multiple layers. The RectangularRegionGroupEntry box may be extended to comprise composition information generated by the media file writer in step 504 and then used by the media file player in step 602. The RectangularRegionGroupEntry describes a rectangular region covered by a group of samples. In this embodiment, the RectangularRegionGroupEntry is modified to include new composition information that indicates the location in the composite picture of the samples referred to by the RectangularRegionGroupEntry box. For instance, the syntax of the modified RectangularRegionGroupEntry might be the following with the introduced new syntax marked in bold characters:

```
class RectangularRegionGroupEntry( ) extends
    VisualSampleGroupEntry('trif'){
    unsigned int(16) groupID;
    unsigned int(1) rect_region_flag;
    if (!rect_region_flag)
        unsigned int(1) composite_region_flag;
        bit(6) reserved = 0;
        if (composite_region_flag) {
            unsigned int(16) composite_horizontal_offset;
            unsigned int(16) composite_vertical_offset;
            unsigned int(16) composite_region_width;
            unsigned int(16) composite_region_height;
        }
    }
    else {
        unsigned int(2) independent_idc;
        unsigned int(1) full_picture;
        unsigned int(1) filtering_disabled;
        unsigned int(1) has_dependency_list;
        bit(2) reserved = 0;
        if (!full_picture) {
            unsigned int(16) horizontal_offset;
            unsigned int(16) vertical_offset;
        }
        unsigned int(16) region_width;
        unsigned int(16) region_height;
        if (has_dependency_list) {
            unsigned int(16) dependency_rect_region_count;
            for (i=1; i<= dependency_rect_region_count; i++)
                unsigned int(16) dependencyRectRegionGroupID;
        }
    }
}
```

With the following semantics for the new syntax elements:

composite_region_flag specifies, for example when equal to 1, that decoded picture of the NAL units associated with this rectangular region group entry is signaled in the bitstream as a rectangular region of a composite picture, and further information of the composite region is provided by subsequent fields in this rectangular region group entry. The other value, for example 0, specifies that the decoded picture of the NAL units associated with this rectangular region group entry is not signaled as a rectangular region of a composite picture, and no further information of the region is provided in this rectangular region group entry.

composite_horizontal_offset and composite_vertical_offset give respectively the horizontal and vertical offsets of the top-left pixel of the composite region that is covered by the NAL units in each rectangular region associated with this rectangular region group entry, relative to the top-left pixel of the base region, in luma samples. The base region used in the RectangularRegionGroupEntry is the composite picture when composite_region_flag equal to 1.

composite_region_width and composite_region_height give respectively the width and height of the composite region in the picture of the composition that is covered by the NAL units in each rectangular region associated with this rectangular region group entry, in luma samples.

As a result, in this embodiment, it is possible to determine the position of the NAL units associated with the rectangular region, i.e. the NAL units of each layer, in the composite picture. The size of the composite picture is inferred from the composite regions described at the origin of the composite picture (composite_horizontal_offset and composite_vertical_offset are both equal to 0) and the position of the bottom most and rightmost pixel of the composition regions in the composite picture. In one alternative, additional syntax elements specify the size of the composite picture in the RectangularRegionGroupEntry box for each region. To avoid repeating this information in all the RectangularRegionGroupEntry boxes, an additional flag (e.g. composite_picture_present_flag) indicate that the RectangularRegionGroupEntry defines the size of the composite picture and not the size of composite region.

In a variant, for a single track encapsulation (i.e. all independent layers of the composition are in the same track), the size of the composite picture is inferred equal to the track's width and height (signalled in the Track Header Box). The composition information of each layer may be provided as a sample group entry of type 'nalm' i.e an NaluMapEntry box associated with RectangularRegionGroupEntry box, one for each layer.

In a variant, for a track encapsulation where each track contains a single layer, the width and height of the composite region are inferred equal to the track's width and height and thus not signalled in the composition information (i.e. for any embodiment describing composition information in a sample group entry).

In a second variant, the composition information is associated to samples of a given layer. The layer information sample group ('linf') conveys information for layers of a given track. In particular, in one embodiment of this present disclosure, the composition information is signalled in a modified layer information sample group entry.

For example, the layer information sample group entry may have the following syntax (new fields indicated in bold):

```
class LayerInfoGroupEntry extends VisualSampleGroupEntry('linf'){
    bit(2) reserved= 0;
    unsigned int (6) num_layers_in_track;
    for (i=0; i<num_layers_in_track; i++){
        bit(4) reserved= 0;
        unsigned int (6) layer_id;
        unsigned int (3) min_TemporalId;
        unsigned int (3) max_TemporalId;
        unsigned int (1) composite_layer_flag;
        if (composite_layer_flag) {
            unsigned int (16) composite_horizontal_offset;
            unsigned int (16) composite_vertical_offset;
            unsigned int (16) composite_region_width;
            unsigned int (16) composite_region_height;
        }
        unsigned int (7) sub_layer_presence_flags;
    }
}
```

With the following semantics for the added syntax elements:

composite_layer_flag equal to 1 specifies that decoded pictures of the NAL units of the layer with nuh_layer_id (i.e. layer identifier) equal to layerID, associated with this layer information sample group entry is signaled in the bitstream as a rectangular region of a composite picture, and further information of the composite region for this layer is provided by subsequent fields in this layer information sample group entry. The value 0 specifies that the decoded picture of the NAL units of the layer with nuh_layer_id (i.e. layer identifier) equal to layerID, associated with this layer information sample group entry is not signalled as a rectangular region of a composite picture, and no further information of the region is provided in this rectangular region sample group entry.

composite_horizontal_offset and composite vertical_offset give respectively the horizontal and vertical offsets of the top-left pixel of the composite region that is covered by the NAL units of the layer with nuh_layer_id (i.e. layer identifier) equal to layerID, in each rectangular region associated with this layer information sample group entry, relative to the top-left pixel of the base region, in luma samples. The base region used in the LayerInfoGroupEntry is the composite picture when composite_layer_flag equal to 1.

composite_region_width and composite_region_height give respectively the width and height of the composite region in the picture of the composition that is covered by the NAL units of the layer with nuh_layer_id (i.e. layer identifier) equal to layerID, in each rectangular region associated with this layer information group entry, in luma samples.

New Box 'crif' Indicating Composition Information

In order to avoid mixing composition information with rectangular region information and therefore to simplify the parsing of the bitstream when composition information is not present the bitstream, this embodiment consists in signalling the composition information in a dedicated sample group entry of sample group description box. For this purpose, a new grouping type is defined: 'crif' for "Composition region information". The four-character code and name here are just examples. Any other reserved 4cc, not conflicting with existing ones, may be used for this purpose of composition information description.

In a first variant, the composition is described as a rectangular region of size width multiplied by height at a position hor_offset, ver_offset from the origin of the composite picture in luma samples. For example, a new CompositeRegionGroupEntry sample group entry box may have the following syntax:

Definition

Group Type: 'crif'
Container: SampleGroupDescriptionBox ('sgpd')
Mandatory: No
Quantity: Zero or more The CompositeRegionGroupEntry may be used to describe a region of a composition of multiple independent layers.

```
class CompositeRegionGroupEntry( ) extends VisualSampleGroupEntry ('crif')
{
  unsigned int (1) composite_region_flag;
  bit(7) reserved = 0;
  if (composite_region_flag){
    unsigned int(16) composite_horizontal_offset;
    unsigned int(16) composite_vertical_offset;
    unsigned int(16) composite_region_width;
    unsigned int(16) composite_region_height;
  }
}
```

The semantics of the syntax elements may be similar to the previous embodiments:

composite_region_flag equal to 1 specifies that decoded picture of the NAL units associated with this composite region group entry is signaled in the bitstream as a rectangular region of a composite picture, and further information of the composite region is provided by subsequent fields in this composite region group entry. The value 0 specifies that the decoded picture of the NAL units associated with this composite region group entry is not signalled as a rectangular region of a composite picture, and no further information of the region is provided in this composite region group entry.

composite_horizontal_offset and composite vertical_offset give respectively the horizontal and vertical offsets of the top-left pixel of the composite region that is covered by the NAL units in each composite region associated with this composite region group entry, relative to the top-left pixel of the base region, in luma samples. The base region used in the CompositeRegionGroupEntry is the composite picture.

composite_region_width and composite_region_height give respectively the width and height of the composite region in the picture of the composition that is covered by the NAL units in each composition region associated with this composition region group entry, in luma samples.

In a variant of any of the previous embodiments, instead of expressing the location and size of the composite regions in luma samples, they are expressed in arbitrary unit size. This arbitrary unit size is either predetermined or expressed as a new parameter of the composition information. For instance, the composition information includes a composite_unit_size_flag flag that equal to 1 indicates the presence of a syntax element specifying the arbitrary unit size in luma samples. This syntax element is for example an unsigned integer expressed with 16 bits length. When the flag is equal to 0, the arbitrary unit is inferred equal to one luma samples.

In a variant, the composite region location and size parameters are normalized by the size of the composite picture. As a result, a value of 2^16−1 for the composite_vertical_offset or the composite_region_height corresponds to the height of the composition picture in luma sample. A value of 2^16−1 for the composite_horizontal_offset or the composite_region_width corresponds to the width of the composition picture in luma sample.

In a variant of any of the previous embodiments, the composition information includes additional syntax elements that permit to represent other kinds of transformations for the decoded pictures of each independent layer. For instance, it specifies one or several of the syntax elements that represent parameters of either a rotation transformation, or/and a scaling transform on one or two axes, or/and downsampling or upsampling operation, or/and mirror operation.

For instance the CompositeRegionGroupEntry syntax is the following:

```
class CompositeRegionGroupEntry( ) extends VisualSampleGroupEntry ('crif')
{
  unsigned int(1) composite_region_flag;
  bit(7) reserved = 0;
  if (composite_region_flag) {
    unsigned int(16) composite_horizontal_offset;
    unsigned int(16) composite_vertical_offset;
    unsigned int(16) composite_region_width;
    unsigned int(16) composite_region_height;
    unsigned int(32) composite_rotation_angle;
    unsigned int(32) composite_scaling_horizontal_factor;
    unsigned int(32) composite_scaling_vertical_factor;
  }
}
```

The syntax element representing a rotation transformation for the decoded pixels of the composite region is composite_rotation_angle. It is a 16.16 fixed-point value that indicates the angle of the rotation in degrees. In a variant, composite_rotation_angle is coded on predetermined bit length and each value corresponds to a predetermined rotation angle value. For instance, composite_rotation_angle is coded on 2 bits and each value corresponds to a multiple of a 90° rotation angle:

A value equal to 0 corresponds to a 0° rotation,
A value equal to 1 corresponds to a 90° rotation,
A value equal to 2 corresponds to a 180° rotation and
A value equal to 3 corresponds to a 270° rotation.

In a variant, a flag may indicate whether the decoded picture of the composite region shall be mirrored.

The composite_scaling_horizontal_factor and composite_scaling_vertical_factor syntax elements represent the upscaling/upsampling (or downscaling/downsampling) factors for the horizontal and vertical direction of the decoded picture of the composite region. These two values are coded for example using 16.16 fixed-point representation. In a variant, when the upsampling factors are constrained to be equal in the composition information the factor is signaled only once.

One advantage of the previous embodiments it to allow defining dynamic composition information for one or more independent layers. Dynamic composition information permits to signal different composition arrangements or characteristics of composition for different time ranges within a track encapsulating VVC samples. Although the signaling is dynamic, a static composition information may be signaled by defining the composition information in a default sample group as per ISOBMFF specification to make the ISOBMFF signaling more compact.

Composition Matrix for Describing the Composition

In some embodiments, the composition may be described using a composition matrix to be applied to the decoded picture resulting in placing the picture into the composition. The composition matrix defines the transformation to be applied to the decoded picture.

In a first variant where the composition information is provided in the 'trif' box, the RectangularRegionGroupEntry box includes an array of nine 32 bits syntax elements, each representing one coefficient of the matrix. Same syntax and semantics are used as described in ISOBMFF for the transformation matrix signaled in the TrackHeader Box (in ISOBMFF, the composition matrix is static for each track). By default, the matrix is inferred corresponding to the unitary matrix, which is an identity transformation.

For example, the RectangularRegionGroupEntry may include the following syntax elements:

```
class RectangularRegionGroupEntry( ) extends
VisualSampleGroupEntry('trif'){
   unsigned int(16) groupID;
   unsigned int(1) rect_region_flag;
   if (!rect_region_flag)
      unsigned int(1) composite_region_flag;
      bit(6) reserved = 0;
      if (composite_region_flag) {
         template int(32) [9]matrix;
      }
   }
   else {
      // unchanged syntax
   }
}
```

With the following semantics for the new syntax elements:

composite_region_flag equal to 1 specifies that decoded picture of the NAL units associated with this rectangular region group entry is signaled in the bitstream as a rectangular region of a composite picture, and further information of the composite region is provided by subsequent fields in this rectangular region group entry. The value 0 specifies that the decoded picture of the NAL units associated with this rectangular region group entry is not signalled as a rectangular region of a composite picture, and no further information of the region is provided in this rectangular region group entry.

matrix provides a transformation matrix for the decoded pixels of the rectangular region of the composite picture.

In a second variant where the composition information is provided in a 'crif' box, the compositeRegionGroupEntry box includes an array of nine 32 bits syntax elements, each representing one coefficient of the matrix. Same syntax and semantics are used as described in ISOBMFF for the transformation matrix signaled in the TrackHeader Box. By default, the matrix is inferred corresponding to the unitary matrix, which is an identity transformation. The syntax may be as follows:

```
class CompositeRegionGroupEntry( ) extends VisualSampleGroupEntry
('crif')
{
   unsigned int(1) composite_region_flag;
   bit(7) reserved = 0;
   if (composite_region_flag)
      template int(32) [9]matrix;
   }
}
```

With the following semantics for the new syntax elements:

composite_region_flag equal to 1 specifies that decoded pictures of the NAL units associated with this composite region group entry is signaled in the bitstream as a rectangular region of a composite picture, and further information of the composite region is provided by subsequent fields in this composite region group entry. The value 0 specifies that the decoded picture of the NAL units associated with this composite region group entry is not signaled as a rectangular region of a composite picture, and no further information of the region is provided in this composite region group entry.

matrix provides a transformation matrix for the decoded pixels of the composite region of the composite picture.

Association of Composition Information with an Operating Point

In previous embodiments the composition information is associated with samples of tracks. A VVC bitstream may contain at least two OLSs, each OLS comprising two or more independent layers. There is at least one independent layer present in both the at least two OLSs. In that case, the composition information associated with the samples of this independent layer may either relate to the composite picture of one of the two OLSs. To address this problem, some embodiments of this proposed method associate the composition information not only with a set of samples but also with an operating point. This makes it possible to determine in which decoding context (i.e. to which operating point) the composition information applies.

According to a first variant, the composition information comprises the list of operating points for which the composition information applies. For example, the list of operating points concerned by the composition may be provided in the 'crif' box. The composition information may include a list of operating points and associated composition parameters.

For instance, when the composition information is signaled in the CompositeRegionGroupEntry box, it includes the following syntax elements:

```
class CompositeRegionGroupEntry( ) extends VisualSampleGroupEntry
('crif')
{
   unsigned int(16) num_operating_points;
   for (i=0; i<num_operating_points) {
      unsigned int(16) output_layer_set_idx;
      unsigned int(1) composite_region_flag;
      bit(7) reserved = 0;
      if (composite_region_flag) {
         unsigned int(16) composite_horizontal_offset;
         unsigned int(16) composite_vertical_offset;
         unsigned int(16) composite_region_width;
         unsigned int(16) composite_region_height;
      }
   }
}
```

With the following semantics for the new syntax elements:

num_operating_points: gives the number of operating points for which the information follows.

output_layer_set_idx is the index of the output layer set that defines the operating point. The mapping between output_layer_set_idx and the layer_id values shall be the same as specified by the VPS for an output layer set with index output_layer_set_idx.

composite_region_flag equal to 1 specifies that decoded pictures of the NAL units associated with this composite region group entry, when decoded as part of this operating point, is signaled in the bitstream as a rectangular region of a composite picture, and further information of the composite region is provided by subsequent fields in this composite region group entry. The value 0 specifies that the decoded picture of the NAL units associated with this composite region group entry is not signalled as a rectangular region of a composite picture, and no further information of the region is provided in this composite region group entry.

composite_horizontal_offset and composite vertical_offset give respectively the horizontal and vertical offsets of the top-left pixel of the composite region that is covered by the NAL units in each composite region associated with this composite region group entry, when decoded as part of this operating point, relative to the top-left pixel of the base region, in luma samples. The base region used in the compositeRegionGroupEntry is the composite picture.

composite_region_width and composite_region_height give respectively the width and height of the composite region in the picture of the composition that is covered by the NAL units in each composite region associated with this composite region group entry, when decoded as part of this operating point, in luma samples.

In a second example, the composition information may be provided in the 'vopi' box. For each layer of the output layer set, the composition information related to the layer is described for this particular operating point. For example, the VvcOperatingPointsRecord may have the following syntax:

```
class VvcOperatingPointsRecord {
   unsigned int(8) num_profile_tier_level_minus1;
   ...
```

-continued

```
   unsigned int(16) num_operating_points;
   for (i=0; i<num_operating_points) {
      ... // syntax and semantics unchanged
      unsigned int(8) layer_count;
      for (j=0; j<layer_count; j++) {
         unsigned int(6) layer_id;
         unsigned int(1) is_outputlayer;
         unsigned int(1) composite_region_flag;
         if (composite_region_flag) {
            unsigned int(16) composite_horizontal_offset;
            unsigned int(16) composite_vertical_offset;
            unsigned int(16) composite_region_width;
            unsigned int(16) composite_region_height;
            //possibly with scaling/rot/crop instructions
         }
      }
   }
}
```

With the following semantics for the new syntax elements:

composite_region_flag equal to 1 specifies that decoded pictures of the NAL units of the layer with nuh_layer_id (i.e. layer identifier) equal to layerID, when decoded as part of this operating point (i.e. the i-th operating point described in the box), is signaled in the bitstream as a rectangular region of a composite picture, and further information of the composite region is provided by subsequent fields in this box. The value 0 specifies that the decoded picture of the NAL units of the NAL units of the layer with nuh_layer_id (i.e. layer identifier) equal to layerID, when decoded as part of this operating point (i.e. the i-th operating point described in the box), is not signalled as a rectangular region of a composite picture, and no further information of the composition for this layer in this operating point.

composite_horizontal_offset and composite vertical_offset give respectively the horizontal and vertical offsets of the top-left pixel of the composite region that is covered by the NAL units of the layer with nuh_layer_id (i.e. layer identifier) equal to layerID, when decoded as part of this operating point, relative to the top-left pixel of the base region, in luma samples. The base region used is the composite picture.

composite_region_width and composite_region_height give respectively the width and height of the composite region in the picture of the composition that is covered by the NAL units of the layer with nuh_layer_id (i.e. layer identifier) equal to layerID, when decoded as part of this operating point, in luma samples.

When the media file writer describes the independent layers in separate tracks it may specify the composition information for each layer and each operating point in the OperatingPointGroupBox box instead of VvcOperatingPointsRecord with a syntax equivalent to the one described above for the VvcOperatingPointsRecord since both boxes share a very similar syntax.

In a variant, the syntax of 'opeg' is modified as follows to provide the contribution of each track to the possible compositions for each operating point, instead of the contribution of each layer to the possible compositions for each operating point.

```
aligned(8) class OperatingPointGroupBox extends
EntityToGroupBox('opeg',0,0)
{
    unsigned int(8) num_profile_tier_level_minus1;
    for (i=0; i<=num_profile_tier_level_minus1; i++)
        VvcPTLRecord(0) opeg_ptl[i];
    unsigned int(16) num_operating_points;
    for (i=0; i<num_operating_points) {
        unsigned int(16) output_layer_set_idx;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
            bit(1) reserved = 0;
        }
        bit(6) reserved = 0;
        unsigned int(1) frame_rate_info_flag;
        unsigned int(1) bit_rate_info_flag;
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
        unsigned int(8) entity_count;
        for (j=0; j<entity_count; j++) {
            unsigned int(8) entity_idx;
            if (composition_flag) {
                unsigned int(16)
composite_horizontal_offset;
                unsigned int(16)
composite_vertical_offset;
                unsigned int(16) composite_region_width;
                unsigned int(16) composite_region_height;
                //possibly with scaling/rot/crop
instructions
            }
        }
    }
}
```

With the following semantics for the new syntax elements:

composition flag equal to 1 specifies that decoded pictures of the NAL units of the track with track_ID (i.e. track identifier) equal to entity_idx, when decoded as part of this operating point (i.e. the i-th operating point described in the box), is signaled in the bitstream as a rectangular region of a composite picture, and further information of the composite region is provided by subsequent fields in this 'opeg'. The value 0 specifies that the decoded picture of the NAL units of the NAL units of the track with track_ID (i.e. track identifier) equal to entity_idx, when decoded as part of this operating point (i.e. the i-th operating point described in the box), is not signalled as a rectangular region of a composite picture, and no further information of the composition for this track follows.

composite_horizontal_offset and composite vertical_offset give respectively the horizontal and vertical offsets of the top-left pixel of the composite region that is covered by the NAL units of the track with track_ID (i.e. track identifier) equal to entity_idx, when decoded as part of this operating point, relative to the top-left pixel of the base region, in luma samples. The base region used is the composite picture.

composite_region_width and composite_region_height give respectively the width and height of the composite region in the picture of the composition that is covered by the NAL units of the track with track_ID (i.e. track identifier) equal to enity_idx, when decoded as part of this operating point, in luma samples.

The composite_region_width and composite_region_height are optional. Parser may rely on the width and height of the track indicated by the entity_idx.

In a second variant, the association between the composition information and the layer in one OLS is made differently. Instead of listing the composition information in the description of operating points (e.g. in 'vopi' or 'opeg'), an identifier is associated with each operating point. The composition information refers to this identifier to indicate in which operating point context the information is meaningful.

As a first example, the CompositeRegionGroupEntry Box provides the composition_ID syntax elements as represented below.

```
class CompositeRegionGroupEntry( ) extends VisualSampleGroupEntry
('crif')
{
    unsigned int(1) composite_region_flag;
    if (composite_region_flag)
    {
        unsigned int(7) composition_ID;
        unsigned int(16) composite_horizontal_offset;
        unsigned int(16) composite_vertical_offset;
        unsigned int(16) composite_region_width;
        unsigned int(16) composite_region_height;
    } else {
        unsigned int(7) reserved;
    }
}
```

This compositionID is a unique identifier for the composition described within this sample group entry. The value of compositionID in a composite region group entry shall be greater than or equal to 0. When a sample group is associated to several SampleGroupDescriptionBox of type 'crif' all these SampleGroupDescriptionBox shall have different value of compositionID. This last statement implies that a composition information with a given identifier provides a unique composition information for a group of samples within a track.

As another example, a media file writer may decide to encapsulate several independent layers in the same track. For example, this kind of encapsulation makes sense when either none or all the independent layers of the track are present in the set of operating points. These independent layers are expected to be played together.

In such a case, the composition information described in a sample group entry (e.g. CompositeRegionGroupEntry) applies for all the NAL unit of a given sample, which may limit the possibility to signal a composition. Indeed, each sample of the track contains NAL units for several layers and the composition information may apply when the layer shares the same location in the bitstream (possibly with layer representing an alpha channel to provide some transparency mechanism).

To allow specifying different composition information for each layer in each sample, a NALUMapEntry box is signaled, in association with sample group of type 'nalm''. A sample group of type 'nalm' may have its grouping_type_parameter set to 'crif' to indicate that within the 'nalm' sample group, the NAL units are mapped to a Sample Group Description box of type 'crif'. This NALUMapEntry would define different groupIDs (i.e. an identifier of a group of NAL units in a sample) for each group of NAL units that correspond to one layer.

In such a case, the composition information may refer to this groupID value to indicate to which layer the composition information applies. For instance, the syntax of the CompositeRegionGroupEntry is the following:

```
class CompositeRegionGroupEntry( ) extends VisualSampleGroupEntry
('crif')
{
  unsigned int(16)group_ID;
  unsigned int(7) composition_ID;
  unsigned int(1) composite_region_flag;
  if (composite_region_flag)
  {
    unsigned int(32) composite_horizontal_offset;
    unsigned int(32) composite_vertical_offset;
    unsigned int(32) composite_region_width;
    unsigned int(32) composite_region_height;
  }
}
``` with the following semantics for the syntax elements:

groupID is an identifier for the composite region group entry described by this sample group entry. It is not an identifier for the composition (purpose of the compositionID). The value of groupID in a composite region group entry shall be greater than 0. The value 0 is reserved for a special use.

When there is SampleToGroupBox of type 'nalm' and grouping_type_parameter equal to 'crif', a SampleGroupDescriptionBox of type 'crif' shall be present, and the following applies:

The value of groupID in a composite region group entry shall be equal to the groupID in one of the entries of NALUMapEntry.

A NAL unit being mapped to groupID 0 by a NALUMapEntry implies that the NAL unit is required for decoding any composition region in the same composite picture as this NAL unit.

compositionID is a unique identifier for the composition described by this sample group entry. The value of compositionID in a composite region group entry shall be greater than or equal to 0. When a sample group is associated to several SampleGroupDescriptionBox of type 'crif' all these SampleGroupDescriptionBox shall have different value of compositionID.

Since groupId is an identifier to distinguish different composition information for NAL units in the sample and compositionID is an identifier to distinguish composite pictures when the NAL units are within different operating points, When a range of NAL units is associated to several SampleGroupDescriptionBox entries of type 'crif', all these SampleGroupDescriptionBox entries shall have different values of compositionID but may have same groupID values.

composite_region_flag equal to 1 specifies that decoded pictures of the NAL units associated with this composite region group entry is signaled in the bitstream as a rectangular region of a composite picture, and further information of the composite region is provided by subsequent fields in this composite region group entry. The value 0 specifies that the decoded pictures of the NAL units associated with this composite region group entry is not signalled as a rectangular region of a composite picture, and no further information of the region is provided in this composite region group entry.

When a multi-layer bitstream is carried in one or more tracks and each layer is a composite region of the same composition, for any two layers layerA and layerB of the bitstream, the following constraint applies: When a NAL unit of layerA is associated with a compositionID value cIdA and a groupId value gIdA for which the corresponding composite_region_flag is equal to 1, and a NAL unit of layerB is associated with a compositionID value cIdB and a groupId value gIdB for which the corresponding composite_region_flag is equal to 1, cIdA and cIdB shall be equal and gIdA and gIdB may be equal.

When a track conveys one or more layers that may be used in more than one compositions, the corresponding NAL units may be mapped to sample group description entries of type 'crif' having different composition IDs but they should have the same groupID, to be referenced in the NALUMapEntry.

composite_horizontal_offset and composite vertical_offset give respectively the horizontal and vertical offsets of the top-left pixel of the composite region that is covered by the NAL units in each composite region associated with this composite region group entry, relative to the top-left pixel of the base region, in luma samples. The base region used in the CompositeRegionGroupEntry is the composite picture.

composite_region_width and composite_region_height give respectively the width and height of the composite region in the picture of the composition that is covered by the NAL units in each composite region associated with this composite region group entry, in luma samples.

Note that parts of some layers of a composition may overlap. In case of overlap, the layer with a higher ID should be above the layer with a lower ID. The composition of layers may also leave gaps in the resulting output. In a variant, a syntax element of the composition information specifies the order of the overlap. The order of overlapping is in increasing order of the value of this syntax element.

In a third variant the VVC Operating point record may refer the composition. The structures defining the operating points are extended to also indicate an identifier of composition associated to an operating point. The composition may be signalled in the bitstream to encapsulate (e.g. composition SEI message) but it may also correspond to an editing of the media file by a user or composition software. For encapsulation of VVC NAL units in file format, three boxes may indicate the operating points present in the bitstream. These boxes are the VvcOperatingPointsRecord, OperatingPointGroupBox or VvcDecoderConfigurationRecord. In one embodiment of the present disclosure, one or more of these boxes refer to the composition identifier for one or more operating points defined in the boxes.

For instance, the VvcOperatingPointsRecord may have the following syntax elements:

```
class VvcOperatingPointsRecord {
  unsigned int(8) num_profile_tier_level_minus1;
  for (i=0; i<=num_profile_tier_level_minus1; i++) {
    unsigned int(8) ptl_max_temporal_id[i];
    VvcPTLRecord(ptl_max_temporal_id[i]+1) ptl[i];
  }
  unsigned int(1) all_independent_layers_flag;
  bit(7) reserved = 0;
  if (all_independent_layers_flag) {
    unsigned int(1) each_layer_is_an_ols_flag;
    bit(7) reserved = 0;
  } else
    unsigned int(8) ols_mode_idc;
  unsigned int(16) num_operating_points;
  for (i=0; i<num_operating_points) {
    unsigned int(16) output_layer_set_idx;
```

-continued

```
    unsigned int(8) ptl_idx;
    unsigned int(8) max_temporal_id;
    unsigned int(8) layer_count;
    for (j=0; j<layer_count; j++) {
        unsigned int(6) layer_id;
        unsigned int(1) is_outputlayer;
        bit(1) reserved = 0;
    }
    bit(5) reserved = 0;
    unsigned int(1) recommended_composition_ols_flag;
    if (recommended_composition_ols_flag) {
        unsigned int (7) composition_group_ID;
        unsigned int(1) reserved = 0;
    }
    unsigned int(1) frame_rate_info_flag
    unsigned int(1) bit_rate_info_flag
    // remaining parts unchanged
  }
}
```

The semantics of the new syntax elements added in the VvcOperatingPointsRecord box have the following semantics:

recommended_composition_ols_flag equal to 1 specifies that the layers of the operating point include several output layers that are recommended to be presented as a composition. recommended_composition_ols_flag equal to 0 specifies that the layers of the operating point are not associated with composition recommendation.

composition group ID specifies the value of the composite region group entry associated with the output layer set.

When the recommended_composition_ols_flag is equal to 1 for one operating point, it is a requirement of the specification that the following assessments are both valid The ISOBMFF file contains composite region group entry (compositeRegionGroupEntry) for the NAL units of the layers which are output layers (is_outputlayer equal to 1) for this operation point; and the composition_ID of composite region group entry (CompositeRegionGroupEntry) shall be equal to composition_group_ID of the operating point as defined in the VVCOperatingPointRecord box.

These statements make sure that a composition information is defined in the sample group entry of the track that contains data of an operating point that indicates that several output layers are recommended to be presented as a composition.

In a variant of this embodiment the VVCOperatingPointRecord box may also define additional information for the composite picture. In particular, for each operating point, the VVCOperatingPointRecord signals the height and width of the composition picture. It may also signal whether the composite pictures apply transform to the decoded pictures of each independent layer of the operating point. For example, a flag may indicate if upsampling/downsampling operations are applied. Another flag may indicate that a rotation transform is required. Another flag may indicate whether the decoded pictures of at least two independent layers overlap in the composite picture or not. It may also indicate the arbitrary unit size used to signal the location and size of the composite region in the composite picture. The VVCOperatingPointRecord may also signal that the composite picture should be scaled with specific horizontal and vertical scaling factors. In addition, a translation of the resulting composite picture may be signaled.

In a fourth variant, the VVC operation point entity to group may refer the composition ID. When composition identifier is associated to operating points of the OperatingPointGroupBox, the syntax may be for example the following:

```
aligned(8)    class    OperatingPointGroupBox    extends
EntityToGroupBox('opeg',0,0)
{
    unsigned int(8) num_profile_tier_level_minus1;
    for (i=0; i<=num_profile_tier_level_minus1; i++)
        VvcPTLRecord(0) opeg_ptl[i];
    unsigned int(16) num_operating_points;
    for (i=0; i<num_operating_points) {
        unsigned int(16) output_layer_set_idx;
        unsigned int(1) recommended_composition_ols_flag;
        if (recommended_composition_ols_flag) {
            unsigned int(7) composition_group_ID;
        }
        else
            unsigned int(7) reserved;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
            bit(1) reserved = 0;
        }
        bit(6) reserved = 0;
        unsigned int(1) frame_rate_info_flag
        unsigned int(1) bit_rate_info_flag
        if (frame_rate_info_flag) {
            unsigned int(16) avgFrameRate;
            bit(6) reserved = 0;
            unsigned int (2) constantFrameRate;
        }
        if (bit_rate_info_flag) {
            unsigned int(32) maxBitRate;
            unsigned int(32) avgBitRate;
        }
        unsigned int(8) entity_count;
        for (j=0; j<entity_count; j++) {
            unsigned int(8) entity_idx;
        }
    }
}
```

With the following semantics:

recommended_composition_ols_flag equal to 1 specifies that the layers of the operating point include several output layers that are recommended to be presented as a composition. recommended_composition_ols_flag equal to 0 specifies that the layers of the operating point are not associated with composition recommendation.

composition group ID specifies the value of the composite region group entry associated with the output layer set.

When the recommended_composition_ols_flag is equal to 1 for one operating point, it is a requirement of the specification that the following assessments are both valid:

The ISOBMFF file contains composite region group entry (compositeRegionGroupEntry) for the NAL units of the layers which are output layers (is_outputlayer equal to 1) for this operation point; and the group_ID of composite region group entry (compositeRegionGroupEntry) shall be equal to composition_group_ID of the operating point as defined in the OperatingPointGroupBox box.

These statements make sure that a composition information is defined in the sample group entry of the track that contains data for an operating point that indicates that several output layers are recommended to be presented as a composition.

In a variant of this embodiment the OperatingPointGroupBox box may also define additional information for the composite picture. In particular, for each operating point, the OperatingPointGroupBox signals the height and width of the composition picture. It may also signal whether the composite pictures apply transform to the decoded pictures of each independent layer of the operating point. For example, a flag may indicate if upsampling/downsampling operations are applied. Another flag may indicate that a rotation transform is required. Another flag may indicate whether the decoded pictures of at least two independent layers overlap in the composite picture or not. It may also indicate the arbitrary unit size used to signal the location and size of the composite region in the composite picture. The OperatingPointGroupBox may also signal that the composite picture should be scaled with specific horizontal and vertical scaling factors. In addition, a translation of the resulting composite picture may be signaled.

In a fifth variant, the VvcDecoderConfigurationRecord box may refer the composition ID. When composition identifier is associated to the operating point of the VvcDecoderConfigurationRecord, the syntax may be for example the following:

```
aligned(8) class VvcDecoderConfigurationRecord {
    unsigned int(8) configurationVersion = 1;
    unsigned int(16) avgFrameRate;
    unsigned int(2) constantFrameRate;
    unsigned int(3) numTemporalLayers;
    unsigned int(2) lengthSizeMinusOne;
    unsigned int(1) ptl_present_flag;
    if (ptl_present_flag) {
        VvcPTLRecord(numTemporalLayers) track_ptl;
        unsigned int(16) output_layer_set_idx;
        unsigned int(1) recommended_composition_ols_flag;
        if (recommended_composition_ols_flag) {
            unsigned int(7) composition_group_ID;
        } else
            unsigned int(7) reserved = 0;
    }
    // remaining parts remain unchanged
}
```

With the following semantics for the new syntax elements:

recommended_composition_ols_flag equal to 1 specifies that the output layer set of index equal to output_layer_set_idx includes several output layers that are recommended to be presented as a composition. recommended_composition_ols_flag equal to 0 specifies that the output layer set of index equal to output_layer_set_idx is not associated with composition recommendation.

composition group ID specifies the value of the identifier of the composite region group entry associated with the output layer set.

In a variant of this embodiment the VvcDecoderConfigurationRecord box may also define additional information for the composite picture. In particular, for the operating point, the VvcDecoderConfigurationRecord signals the height and width of the composition picture. It may also signal whether the composite pictures apply transform to the decoded pictures of each independent layer of the operating point. For example, a flag may indicate if upsampling/downsampling operations are applied. Another flag may indicate that a rotation transform is required. Another flag may indicate whether the decoded pictures of at least two independent layers overlap in the composite picture or not. It may also indicate the arbitrary unit size used to signal the location and size of the composite region in the composite picture. The VvcDecoderConfigurationRecord may also signal that the composite picture should be scaled with specific horizontal and vertical scaling factor. In addition, a translation of the resulting composite picture may be signaled.

Combination of 'ropi' and 'crif'

In one embodiment, a media file writer, or an intermediate node of the network, filters or restricts (i.e. it removes encoded data) an ISOBMFF media file that contains multiple independent layers with composition information. This filtering or restriction results in a restricted set of OLS present in the file, compared to a list of operating points possibly declared in a 'vopi' or 'opeg' structure. In that case, it may signal Restricted Operating Points Information sample group to indicate the restricted set of OLSs that are accessible in the media file. The media file writer may signal a Composite Region Group Entry ('crif') to provide composition information for the independent layers. In such a case, the media file writer may remove Composite Region Group Entries that are not part of the restricted or filtered set of OLS.

In a variant, the media file parser determines the OLS restriction information from the Composite Region Group Entry. When the operating point associated to the composition information signals a restriction, the media file parser determines if restriction applies for one of the layers or one of the sublayers of the OLS. When the restriction is made for at least one layer of the output layer set (restricted_ols_flag equals to 1 for the operating point), the composition information signaled is considered as invalid and the operating point is ignored in a step 603. On the other hand, if the restriction is for a sublayer (restricted_sublayer_flag equals to 1 and restricted_ols_flag equals to 0), the composition information is considered as valid and the operating point may be selected in a step 603. Indeed, when a sublayer of an operating point has been filtered, the composition can still be done since the size of the decoded picture remains the same, only the frame rate of the reconstructed images may change.

In a variant, the signaling of the composition information depends on the restriction information. For example, in one embodiment the VvcOperatingPointsRecord syntax includes the following additional elements (in bold):

```
class VvcOperatingPointsRecord {
    unsigned int(8) num_profile_tier_level_minus1;
    // remaining parts unchanged
    unsigned int(16) num_operating_points;
    for (i=0; i<num_operating_points) {
        unsigned int(9) output_layer_set_idx;
        unsigned int(1) restricted_ols_flag;
        unsigned int(1) restricted_sublayer_flag;
        if (restricted_sublayer_flag) {
            unsigned int(3) restricted_htid;
            unsigned int(2) reserved;
        }
        else
            unsigned int(5) reserved;
        if (!restricted_ols_flag) {
            unsigned int(1) recommended_composition_ols_flag;
            if (recommended_composition_ols_flag) {
                unsigned int(7) composition_group_ID;
            }
            else
                unsigned int(7) reserved = 0;
        }
        // remaining parts unchanged
    }
}
```

The semantics of the syntax elements are the same as in previous embodiments, the main difference is that the presence of the syntax elements that associate composition information with an operating point depends on the restricted_ols_flag. For example, the composition_group_ID syntax element is present only for valid OLS, i.e. when restricted_ols_flag is not equal to 0.

Figure 7:
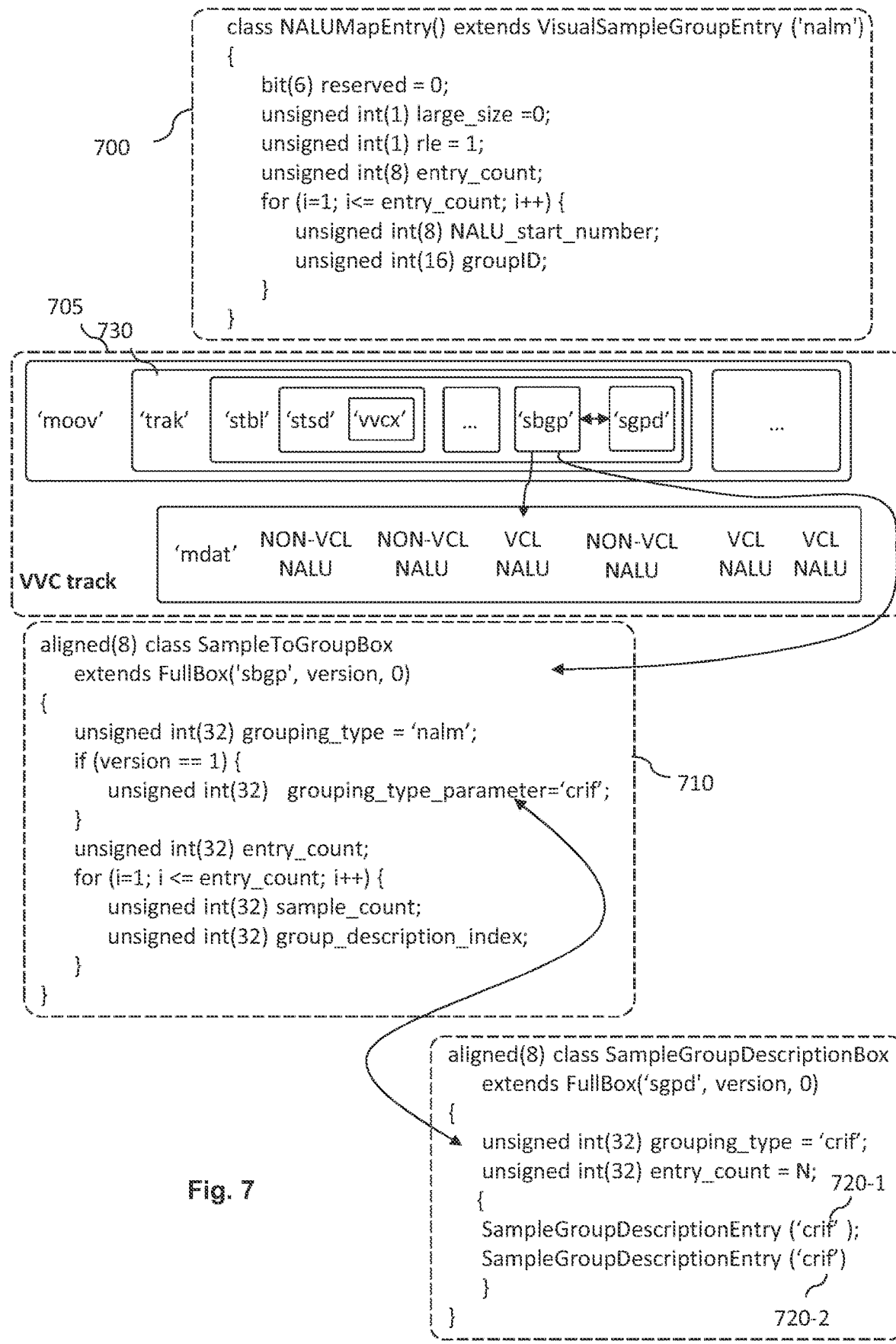
FIG. 7 illustrates an example of ISOBMFF file according to an embodiment of the present disclosure.

FIG. 7 illustrates an example of ISOBMFF file 705 according to an embodiment of the proposed methods, with more than one independent layers in the same bitstream, the layers being in one output layer set. The bitstream also provides non-VCL NAL units with syntax elements that represent a composition of the decoded pictures of the multiple independent layers. In this example, the first track 730 of the media file 705 includes several independent layers. The composition information associated with the layers are specified in CompositeRegionGroupEntry boxes 720-1 and 720-2. These CompositeRegionGroupEntry boxes include same composition_ID values (i.e. the independent layers are part of the same operating point) and different groupID values. The groupId values are the identifiers of 'crif' entries onto which a range of NAL units corresponding to each independent layer as described the NALUMapEntry box 700 is mapped. The sampleToGroupBox 710 defines the samples of the tracks for which a NAL unit mapping (700) is defined and for which a composition information (720-1, 720-2 . . . ) may apply. As a result, the ISOBMFF generated by the media file writer permits to signal the composition information provided in the non-VCL NAL units of the VVC bitstream (e.g. SEI messages).

Figure 8:
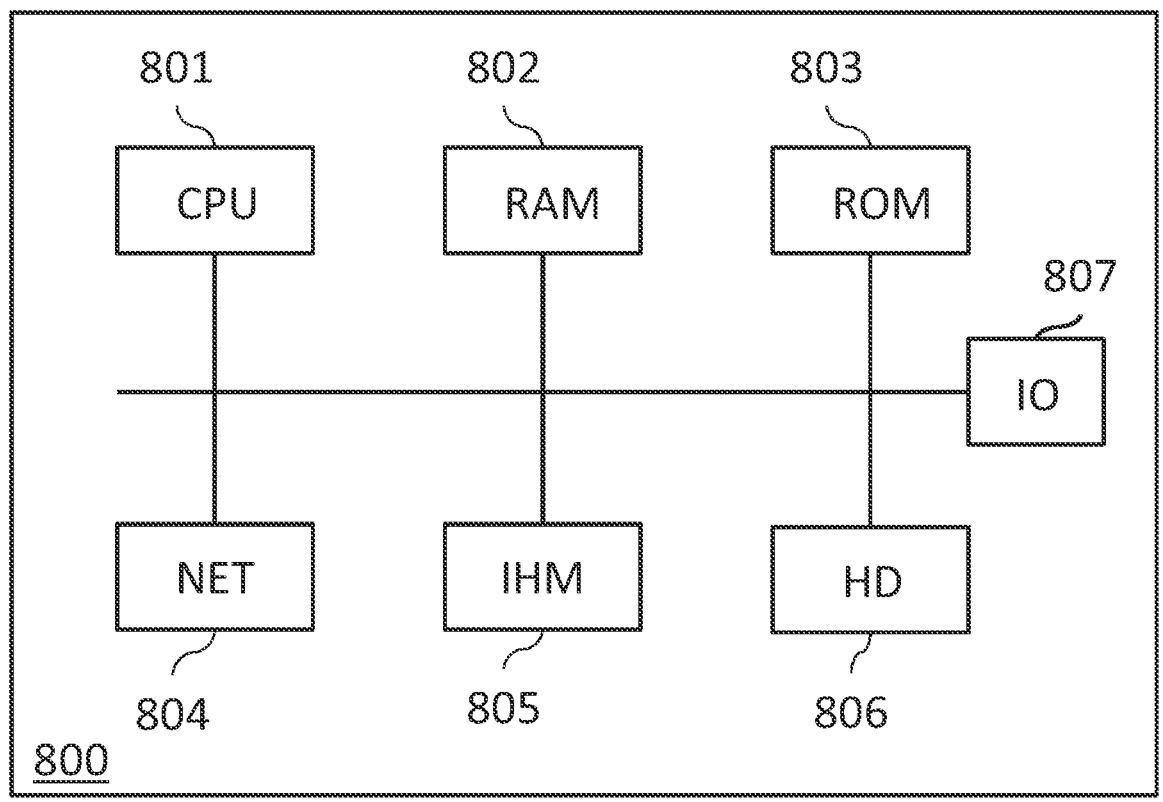
FIG. 8 is a schematic block diagram of a computing device for implementation of one or more embodiments of the present disclosure.

FIG. 8 is a schematic block diagram of a computing device 800 for implementation of one or more embodiments of the disclosure. The computing device 800 may be a device such as a micro-computer, a workstation or a light portable device. The computing device 800 comprises a communication bus connected to:
- a central processing unit 801, such as a microprocessor, denoted CPU;
- a random access memory 802, denoted RAM, for storing the executable code of the method of embodiments of the disclosure as well as the registers adapted to record variables and parameters necessary for implementing the method according to embodiments of the disclosure, the memory capacity thereof can be expanded by an optional RAM connected to an expansion port for example;
- a read only memory 803, denoted ROM, for storing computer programs for implementing embodiments of the disclosure;
- a network interface 804 is typically connected to a communication network over which digital data to be processed are transmitted or received. The network interface 804 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 801;
- a user interface 805 may be used for receiving inputs from a user or to display information to a user;
- a hard disk 806 denoted HD may be provided as a mass storage device;
- an I/O module 807 may be used for receiving/sending data from/to external devices such as a video source or display.

The executable code may be stored either in read only memory 803, on the hard disk 806 or on a removable digital medium such as for example a disk. According to a variant, the executable code of the programs can be received by means of a communication network, via the network interface 804, in order to be stored in one of the storage means of the communication device 800, such as the hard disk 806, before being executed.

The central processing unit 801 is adapted to control and direct the execution of the instructions or portions of software code of the program or programs according to embodiments of the present disclosure, which instructions are stored in one of the aforementioned storage means. After powering on, the CPU 801 is capable of executing instructions from main RAM memory 802 relating to a software application after those instructions have been loaded from the program ROM 803 or the hard-disc (HD) 806 for example. Such a software application, when executed by the CPU 801, causes the steps of the flowcharts of the present disclosure to be performed.

Any step of the algorithms of the present disclosure may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present disclosure has been described hereinabove with reference to specific embodiments, the present disclosure is not limited to the specific embodiments, and modifications will be apparent to a skilled person in the art which lie within the scope of the present disclosure.

Many further modifications and variations will suggest themselves to those versed in the art upon making reference to the foregoing illustrative embodiments, which are given by way of example only and which are not intended to limit the scope of the present disclosure, that being determined solely by the appended claims. In particular the different features from different embodiments may be interchanged, where appropriate.

Each of the embodiments of the present disclosure described above can be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encapsulating a bitstream of encoded media data in an ISOBMFF media file, the method comprising:
    obtaining the bitstream, media data in the bitstream being organized into NAL units;
    obtaining from the bitstream a NAL unit describing a plurality of operating points; and
    generating the media file comprising the bitstream and comprising at least one metadata box comprising first information describing the plurality of operating points,
    wherein the at least one metadata box further comprises second information for indicating whether some NAL units associated with at least one operating point of the plurality of operating points are missing in the media file, and
    wherein, if the second information indicates some NAL units are missing, the at least one metadata box further comprises, for each operating point of the plurality of operating points, third information for indicating at least whether a layer of the operating point is missing or a temporal sublayer of the operating point is missing.

2. The method of claim 1, wherein the second information indicates whether all the operating points of the plurality of operating points have all their NAL units in the media file.

3. The method of claim 1, wherein the third information further indicates whether the operating point has all its NAL units in the media file.

4. The method of claim 1, wherein:
the third information further indicates whether a layer and a temporal sub-layer of the operating point are missing.

5. The method of claim 1, wherein
the metadata box represents a 'vopi' sample group.

6. The method of claim 1, wherein the metadata box is a 'opeg' box.

7. The method of claim 1, wherein:
the obtaining the bitstream further comprises:
obtaining an original bitstream, video data in the original bitstream being organized into NAL units and comprising an original plurality of operating points;
obtaining from the original bitstream a NAL unit describing a second plurality of operating points, the original plurality of operating points comprising at least the second plurality of operating points; and
obtaining the bitstream by filtering the original bitstream based on the NAL unit describing the second plurality of operating points.

8. The method of claim 7, wherein:
the NAL unit describing the second plurality of operating points is of an OPI, Operating Point Information, type.

9. The method of claim 7, wherein:
the NAL unit describing the original plurality of operating points is of a VPS, Video Parameter Set, type.

10. The method of claim 1, wherein:
the NAL unit describing the plurality of operating points is of a VPS, Video Parameter Set, type.

11. A non-transitory computer-readable storage medium storing instructions of a computer program for implementing a method according to claim 1.

12. A method of decoding a bitstream of encoded media data in an ISOBMFF media file, the method comprising:
obtaining the bitstream from the media file, media data in the bitstream being organized into NAL units;
obtaining from the bitstream at least one metadata box comprising first information describing a plurality of operating points; and
decoding an operating point in the bitstream,
wherein the at least one metadata box further comprises second information for indicating whether some NAL units associated with at least one operating point of the plurality of operating points are missing in the media file;
wherein, if the second information indicates some NAL units are missing, the at least one metadata box further comprises, for each operating point of the plurality of operating points, third information for indicating at least whether a layer of the operating point is missing or a temporal sublayer of the operating point is missing, and
wherein the decoded operating point is an operating point having all its NAL units in the media file.

13. A non-transitory computer-readable storage medium storing instructions of a computer program for implementing a method according to claim 12.

14. A device for encapsulating a bitstream of encoded video data in an ISOBMFF media file, the device comprising a processor configured for:
obtaining the bitstream, media data in the bitstream being organized into NAL units;
obtaining from the bitstream a NAL unit describing a plurality of operating points; and
generating the media file comprising the bitstream and comprising at least one metadata box comprising first information describing the plurality of operating points,
wherein the at least one metadata box further comprises second information for indicating whether some NAL units associated with at least one operating point of the plurality of operating points are missing in the media file, and
wherein, if the second information indicates some NAL units are missing, the at least one metadata box further comprises, for each operating point of the plurality of operating points, third information for indicating at least whether a layer of the operating point is missing or a temporal sublayer of the operating point is missing.

15. A device for decoding a bitstream of encoded media data in an ISOBMFF media file, the device comprising a processor configured for:
obtaining the bitstream from the media file, media data in the bitstream being organized into NAL units;
obtaining from the bitstream at least one metadata box comprising first information describing a plurality of operating points; and
decoding an operating point in the bitstream,
wherein the at least one metadata box further comprises second information for indicating whether some NAL units associated with at least one operating point of the plurality of operating points are missing in the media file;
wherein, if the second information indicates some NAL units are missing, the at least one metadata box further comprises, for each operating point of the plurality of operating points, third information for indicating at least whether a layer of the operating point is missing or a temporal sublayer of the operating point is missing, and
wherein the decoded operating point is an operating point having all its NAL units in the media file.

* * * * *